United States Patent
Beal et al.

(10) Patent No.: US 8,271,147 B2
(45) Date of Patent: Sep. 18, 2012

(54) METHODS AND APPARATUS FOR ENERGY DEMAND MANAGEMENT

(75) Inventors: Jacob S. Beal, Somerville, MA (US); Jonathan R. Bachrach, Berkeley, CA (US)

(73) Assignee: Massachusetts Institute of Technology, Cambridge, MA (US)

( * ) Notice: Subject to any disclaimer, the term of this patent is extended or adjusted under 35 U.S.C. 154(b) by 733 days.

(21) Appl. No.: 12/394,011

(22) Filed: Feb. 26, 2009

(65) Prior Publication Data

US 2010/0217450 A1    Aug. 26, 2010

(51) Int. Cl.
G06F 1/32 (2006.01)
G06F 1/26 (2006.01)

(52) U.S. Cl. .......................................... 700/295; 700/20

(58) Field of Classification Search ............ 700/20, 700/22, 286, 291, 295; 713/300, 320
See application file for complete search history.

(56) References Cited

U.S. PATENT DOCUMENTS

| | | | |
|---|---|---|---|
| 5,481,140 A | 1/1996 | Maruyama et al. | |
| 5,572,438 A | 11/1996 | Ehlers et al. | |
| 5,684,710 A | 11/1997 | Ehlers et al. | |
| 5,696,695 A | 12/1997 | Ehlers et al. | |
| 5,770,895 A | 6/1998 | Kumasaka | |
| 5,924,486 A | 7/1999 | Ehlers et al. | |
| 5,966,125 A * | 10/1999 | Johnson | 715/835 |
| 6,216,956 B1 | 4/2001 | Ehlers et al. | |
| 6,671,586 B2 * | 12/2003 | Davis et al. | 700/295 |
| 6,798,631 B1 * | 9/2004 | Farsetta | 361/115 |
| 6,862,498 B2 * | 3/2005 | Davis et al. | 700/295 |
| 6,891,478 B2 * | 5/2005 | Gardner | 340/635 |
| 7,184,861 B2 * | 2/2007 | Petite | 700/295 |
| 7,373,222 B1 | 5/2008 | Wright et al. | |
| 7,738,999 B2 * | 6/2010 | Petite | 700/295 |
| 2003/0020333 A1 | 1/2003 | Ying | |
| 2005/0027636 A1 | 2/2005 | Gilbert et al. | |
| 2005/0043860 A1 | 2/2005 | Petite | |
| 2005/0222855 A1 | 10/2005 | Brunson | |
| 2007/0135973 A1 * | 6/2007 | Petite | 700/295 |
| 2008/0015742 A1 | 1/2008 | Kulyk et al. | |
| 2008/0248764 A1 * | 10/2008 | Oh et al. | 455/91 |
| 2010/0038218 A1 * | 2/2010 | Fisher et al. | 200/51.02 |
| 2010/0186600 A1 * | 7/2010 | Lewis et al. | 99/327 |

OTHER PUBLICATIONS

International Search Report and Written Opinion from corresponding PCT application No. US2010/000495 mailed Jun. 9, 2010.

(Continued)

*Primary Examiner* — Charles Kasenge
(74) *Attorney, Agent, or Firm* — Foley & Lardner LLP

(57) ABSTRACT

Methods, apparatuses and systems for managing energy demand of one or more appliances. In one example, an appliance controller apparatus is provided, comprising a user interface configured to receive a user input indicative of a demand flexibility associated with an appliance, a communication interface configured to receive a control input indicative of a request to modify a power demand of the appliance, and a processor programmed to determine whether the power demand of the appliance is to be modified based on the user input and the control input. In a further aspect, a meter controller apparatus is provided, comprising a communication interface configured to receive a message from an appliance controller apparatus coupled to an appliance, the message comprising information regarding a power demand of the appliance and a demand category associated with the appliance. The meter controller apparatus may further comprise a processor programmed to compute an updated meter controller model based on the message received from the appliance controller apparatus and a present meter controller model.

23 Claims, 21 Drawing Sheets

OTHER PUBLICATIONS

Leow, W.L., "The Energy Box," MIT Center for Engineering Systems Fundamentals, 51 pp. 2008.

Arens, E. et al., "Demand Response Enabling Technology Development," UC Berkeley, 108 pp. 2006.

* cited by examiner

Appliance Controller Consumption Level: $w_i$
Appliance Controller Demand Category: $c_i$
Local Knowledge Set: $L_i = \{<j, w_j, c_j, h_j, t_j>\}_j$ Local Modeling Loop:
Periodic Update and Broadcast
(Appliance Controller)

Local Modeling Loop:
Processing Received Broadcast
(Appliance Controller)

Processing Information
from Local Modeling Loop
(Meter Controller)

Meter Controller Model: $l_i$
Representative Model: $m_i$
Neighbor Model Set: $N_i = \{<j, n_j, t_j>\}_j$ City-Wide Modeling Loop:
Periodic Update and Broadcast
(Meter Controller)

Neighbor Model Set: $N_i = \{<j, n_j, t_j>\}_j$

City-Wide Modeling Loop:
Processing Received Broadcast
(Meter Controller)

Demand Tuple: $D_i = <\alpha_i, \beta_i, h_i, t_i>$

Utility Control Loop:
Periodic Update and Broadcast
(Demand Controller)

Demand Tuple: $D_i = <\alpha_i, \beta_i, h_i, t_i>$

Utility Control Loop:
Periodic Update and Broadcast
(Meter Controller)

Demand Tuple: $D_i = <\alpha_i, \beta_i, h_i, t_i>$
Received Tuple: $D_k = <\alpha_k, \beta_k, h_k, t_k>$ Utility Control Loop:
Processing Received Broadcast
(Meter Controller)

Local Control Loop:
Periodic Update and Broadcast
(Meter Controller)

Selecting Threshold Tuple for
Local Control Loop
(Meter Controller)

Control Tuple: $C_i = <\gamma_i, h_i, t_i>$
Received Control Tuple: $C_k = <\gamma_k, h_k, t_k>$ Local Control Loop:
Processing Received Broadcast
(Appliance Controller)

Control Tuple: $C_i = \langle \gamma_i, h_i, t_i \rangle$
Appliance Controller Demand Category: $c_i$
Delay: $d_i$ Local Control Loop:
Periodic Update and Broadcast
(Appliance Controller)

Local Control Loop:
Controlling Appliances
(Appliance Controller)

METHODS AND APPARATUS FOR ENERGY DEMAND MANAGEMENT

GOVERNMENT SPONSORED RESEARCH

This invention was made with government support under grant number CCF0621897 awarded by the National Science Foundation. The government has certain rights in this invention.

BACKGROUND

Existing energy systems are plagued by high variability in demand for power and the lack of effective control over the demand. For example, peak electrical consumption (in terms of wattage) is much higher than average consumption, but the total duration of peak consumption is relatively short. It can be costly to maintain the surge capacity that is only needed during peak consumption periods. As a result, utility companies often impose brown-outs and/or black-outs when capacity is insufficient. This practice has many negative impacts on the residents and businesses in the service area.

Some research has been done in recent years to develop more cost effective and less intrusive methods for easing the strains on existing energy systems. For example, studies have shown that there is a high level of flexibility in actual consumer requirements, and therefore it is possible in theory to reduce peak consumption without depriving consumers of energy they are unwilling to give up.

One conventional approach is to encourage consumers to conserve energy voluntarily by increasing their awareness of energy consumption. For example, studies have shown that information about energy consumption of consumers relative to their neighbors can cause high consumers to dramatically reduce their consumption. Also, studies conducted in California showed that consumers given a "mood ring" that indicates in real time the stress on the power grid dramatically reduced their peak-time consumption.

Another conventional approach is to use energy pricing, either in real or virtual currency, to gauge each consumer's willingness to reduce consumption. In these so-called market-based systems, the price of energy is allowed to fluctuate in real time based on actual demand, which provides an economic incentive for consumers to reduce consumption when the actual demand is high. The rationale behind these systems is that the price a consumer is willing to pay for energy is inversely related to the consumer's willingness to reduce energy consumption, so that a consumer who is more willing to reduce energy consumption will do so at a lower price point compared to another consumer who is less willing to reduce energy consumption. Thus, as the market finds equilibrium, the system approaches a desired state where each consumer reduces energy consumption only to the extent he is willing.

Conventional systems have also been developed to control energy demand related to heating and/or cooling in a building. Typically, these systems employ a centralized architecture where a central controller collects information from various sources and provides control signals to heating and/or cooling units based on the collected information. An example of such a system is illustrated in FIG. 1, which depicts a central controller 110 in communication with sensors and appliances within a home, a consumer 120 living in the home, and a utility provider 130 providing electrical energy to the home. The central controller 110 receives information such as ambient temperature and relative humidity from sensors 140 and 145 placed at various locations. The central controller 110 also receives present consumption information from a heating unit 150 and an air conditioning unit 155 and energy pricing information from the utility provider 130. Then the central controller 110 presents the received information to the consumer 120 and allows the consumer 120 to specify consumption policies, such as different ranges of target temperatures in relation to the pricing of electricity. Based on the current sensed conditions, the current price of electricity and the policies entered by the consumer 120, the central controller 110 sends appropriate control signals to operate the heating unit 150 and the air conditioning unit 155.

SUMMARY

Applicants have appreciated that existing energy demand management systems have limited scalability because they employ a centralized controller for an entire control environment, so that all of the information processing and decision making is concentrated at the centralized controller. As the control environment expands, more processing capabilities are needed at the centralized controller in order to handle the increase in computational complexity, which may increase the cost of the demand management system.

Applicants have also appreciated that most existing energy demand management systems focus on heating and/or cooling applications and cannot be easily adapted to control appliances other than heating/cooling units. Among the few existing systems that do allow a consumer to control the power consumption of generic appliances, a priority list of appliances is typically used for specifying the order in which the appliances will be turned off in case of a power shortage. These techniques require a high level of involvement from the consumer, both at the initial setup and during continued maintenance. They have also been limited to applications in a single building, at least for the lack of a practical implementation of a priority list of appliances at a city or neighborhood level.

Applicants have further appreciated that conventional market-based systems for controlling energy demand may have unintended negative effects such as creating social inequalities. For example, wealthy consumers may not have sufficient incentive to reduce non-essential consumption even during peak consumption periods, while consumers truly in need of basic consumption may not be able to afford energy during peak consumption periods due to the increase in prices. Absent additional means to distinguish basic needs from non-essential consumption, such social inequalities may be unavoidable in a market-based system.

In accordance with one embodiment of the invention, an appliance controller apparatus is provided for controlling a first power demand of at least one first appliance. The appliance controller apparatus may comprise: a user interface configured to receive a user input indicative of a first demand flexibility associated with the at least one first appliance; a communication interface configured to receive a control input indicative of a request to modify the first power demand of the at least one first appliance; and at least one processor programmed to determine whether the first power demand of the at least one first appliance is to be modified based at least in part on the user input and the control input.

In accordance with a further embodiment of the invention, a method is provided for controlling a first power demand of at least one first appliance. The method may comprise acts of: receiving, via a user interface of a first appliance controller, a user input indicative of a first demand flexibility associated with the at least one first appliance; receiving, via a communication interface of the first appliance controller, a control input indicative of a request to modify the first power demand of the at least one first appliance; and determining whether the first power demand of the at least one first appliance is to be modified based at least in part on the user input and the control input.

In accordance with a further embodiment of the invention, at least one computer-readable medium is provided, encoded with a plurality of instructions that, when executed, perform a method for controlling a first power demand of at least one first appliance. The method may comprise acts of: receiving, via a user interface of a first appliance controller, a user input indicative of a first demand flexibility associated with the at least one first appliance; receiving, via a communication interface of the first appliance controller, a control input indicative of a request to modify the first power demand of the at least one first appliance; and determining whether the first power demand of the at least one first appliance is to be modified based at least in part on the user input and the control input.

In accordance with a further embodiment of the invention, a meter controller apparatus is provided for managing energy demands of a plurality of appliances. The meter controller apparatus may comprise at least one communication interface configured to receive a first message from a first appliance controller apparatus coupled to at least one first appliance of the plurality of appliances, the first message comprising first information regarding a first power demand of the at least one first appliance and a first demand category associated with the at least one first appliance, wherein the first demand category is one of a plurality of demand categories; and at least one processor programmed to compute an updated meter controller model for the plurality of appliances based at least in part on the first message received from the first appliance controller apparatus and a present meter controller model for the plurality of appliances.

In accordance with a further embodiment of the invention, a method is provided for managing energy demands of a plurality of appliances. The method may comprise: receiving, via at least one communication interface of a meter controller apparatus, a first message from a first appliance controller apparatus coupled to at least one first appliance of the plurality of appliances, the first message comprising first information regarding a first power demand of the at least one first appliance and a first demand category associated with the at least one first appliance, wherein the first demand category is one of a plurality of demand categories; and computing, by at least one processor of the meter controller apparatus, an updated meter controller model for the plurality of appliances based at least in part on the first message received from the first appliance controller apparatus and a present meter controller model for the plurality of appliances.

In accordance with a further embodiment of the invention, at least one computer-readable medium is provided, encoded with a plurality of instructions that, when executed, perform a method for managing energy demands of a plurality of appliances. The method may comprise: receiving, via at least one communication interface of a meter controller apparatus, a first message from a first appliance controller apparatus coupled to at least one first appliance of the plurality of appliances, the first message comprising first information regarding a first power demand of the at least one first appliance and a first demand category associated with the at least one first appliance, wherein the first demand category is one of a plurality of demand categories; and computing, by at least one processor of the meter controller apparatus, an updated meter controller model for the plurality of appliances based at least in part on the first message received from the first appliance controller apparatus and a present meter controller model for the plurality of appliances.

In accordance with a further embodiment of the invention, a system is provided for managing energy demands of a plurality of appliances. The system may comprise a first meter controller apparatus comprising at least one communication interface and at least one processor and a first appliance controller apparatus coupled to at least one first appliance of the plurality of appliances, wherein: the at least one communication interface is configured to receive a first message from the first appliance controller apparatus, the first message comprising first information regarding a first power demand of the at least one first appliance and a first demand category associated with the at least one first appliance, wherein the first demand category is one of a plurality of demand categories; the at least one processor is programmed to compute an updated meter controller model for the plurality of appliances based at least in part on the first message received from the first appliance controller apparatus and a present meter controller model for the plurality of appliances; the at least one communication interface is further configured to receive a second message from a second meter controller apparatus, the second message comprising a neighbor model; the at least one processor is further programmed to compute a representative model based at least in part on the updated meter controller model and the neighbor model; the at least one communication interface is further configured to receive a third message comprising a target demand model; the at least one processor is further programmed to compute a control input based at least in part on the target demand model and the representative model; the at least one communication interface is further configured to transmit a fourth message comprising the control input; and the first appliance controller apparatus is configured to receive the fourth message and control the first power demand of the at least one first appliance based at least partially on the control input and the first demand category associated with the at least one first appliance.

In accordance with a further embodiment of the invention, a method is provided for controlling at least a first power demand of a first appliance of a plurality of appliances operating in a first local environment, the first local environment and at least a second local environment constituting a city-wide environment to which power is supplied by a utility provider, the first appliance and at least some other appliances of the plurality of appliances being respectively associated with a corresponding appliance controller such that the first local environment includes a plurality of appliance controllers including a first appliance controller associated with the first appliance, the plurality of appliance controllers of the first local environment being in communication with a first meter controller associated with the first local environment. The method may comprise: A) maintaining, at the first appliance controller, first local knowledge set comprising information relating to the plurality of appliance controllers in the local environment, the first local knowledge set including a plurality of entries, each entry of the plurality of entries corresponding to a unique appliance controller of the plurality of appliance controllers, each entry including a demand model associated with the unique appliance controller and a demand category associated with the unique appliance controller, the demand category being one of a plurality of predetermined demand categories corresponding to different degrees of demand flexibility; B) periodically monitoring the first power demand of the first appliance and a first demand category associated with the first appliance controller; C) periodically updating the first local knowledge set based on B); D) periodically receiving, at the first appliance controller, second local knowledge set from at least one of the plurality of appliance controllers other than the first appliance controller; E) periodically updating the first local knowledge set based on D); F) periodically broadcasting the first local knowledge set to the plurality of appliance controllers other than the first appliance controller; G) transmitting the first local knowledge set to the first meter controller; H) maintaining at the first meter controller a first meter controller model based at least in part on the first local knowledge set, the first meter controller model including a plurality of subtotal power demand values, each subtotal power demand value corresponding to a different one of the plurality of predetermined demand categories; I) maintaining at the first meter controller a first representative city-wide model based at least in part on the first meter controller model, the first representative city-wide model including a plurality of estimated mean per-consumer subtotal power demand values, each estimated mean per-consumer subtotal power demand value corresponding to a different one of the plurality of predetermined demand categories; J) maintaining at the first meter controller a first neighbor model set, the first neighbor model set comprising information relating to a plurality of meter controllers in the city-wide environment, the first neighbor model set including a plurality of neighbor models, each neighbor model of the plurality of neighbor models corresponding to a unique meter controller of the plurality of meter controllers; K) periodically receiving at the first meter controller at least one neighbor model from at least one of the plurality of meter controllers other than the first meter controller; L) periodically updating the first neighbor model set based on K); M) periodically updating the first representative city-wide model based on the first meter controller model and the first neighbor model set updated in L); N) periodically broadcasting the first representative city-wide model to the plurality of meter controllers other than the first meter controller; O) receiving at the first meter controller a present power demand and a target power demand for the city-wide environment; P) calculating at the first meter controller a first control input for the first local environment based at least in part on the target power demand and the first representative city-wide model, the first control input representing a requested degree of power demand reduction in the first local environment; Q) broadcasting the first control input to the plurality of appliance controllers; R) receiving the first control input at the first appliance controller; S) making a comparison, at the first appliance controller, of the first control input and the first demand category associated with the first appliance controller; and T) controlling the first power demand of the first appliance based on the comparison in S).

In accordance with a further embodiment of the invention, a method is provided for controlling at least a first power demand of a first appliance of a plurality of appliances operating in a first local environment, the first local environment and at least a second local environment constituting a city-wide environment to which power is supplied by a utility provider, the first appliance and at least some other appliances of the plurality of appliances being respectively associated with a corresponding appliance controller such that the first local environment includes a plurality of appliance controllers including a first appliance controller associated with the first appliance, the plurality of appliance controllers of the first local environment being in communication with a first meter controller associated with the first local environment. The method may comprise: A) maintaining, at the first appliance controller, a first local knowledge set comprising information relating to the plurality of appliance controllers in the local environment, the first local knowledge set including a plurality of entries, each entry of the plurality of entries corresponding to a unique appliance controller of the plurality of appliance controllers, each entry including: a demand model associated with the unique appliance controller; and a demand category associated with the unique appliance controller, the demand category being one of a plurality of predetermined demand categories corresponding to different degrees of demand flexibility; B) transmitting the first local knowledge set to the first meter controller; C) maintaining at the first meter controller a first meter controller model based at least in part on the first local knowledge set, the first meter controller model including a plurality of subtotal power demand values, each subtotal power demand value corresponding to a different one of the plurality of predetermined demand categories; D) maintaining at the first meter controller a first representative city-wide model based at least in part on the first meter controller model, the first representative city-wide model including a plurality of estimated mean per-consumer subtotal power demand values, each estimated mean per-consumer subtotal power demand value corresponding to a different one of the plurality of predetermined demand categories; E) receiving at the first meter controller a present power demand and a target power demand for the city-wide environment; F) calculating at the first meter controller a first control input for the first local environment based at least in part on the target power demand and the first representative city-wide model, the first control input representing a requested degree of power demand reduction in the first local environment; G) receiving the first control input at the first appliance controller; H) making a comparison, at the first appliance controller, of the first control input and the first demand category associated with the first appliance controller; and I) controlling the first power demand of the first appliance based on the comparison in H).

In accordance with a further embodiment of the invention, a method is provided for controlling at least a first power demand of a first appliance of a plurality of appliances operating in a first local environment, the first local environment and at least a second local environment constituting a city-wide environment to which power is supplied by a utility provider, the first appliance and at least some other appliances of the plurality of appliances being respectively associated with a corresponding appliance controller such that the first local environment includes a plurality of appliance controllers including a first appliance controller associated with the first appliance, the plurality of appliance controllers of the first local environment being in communication with a first meter controller associated with the first local environment. The method may comprise: A) maintaining, at the first appliance controller, first local knowledge set comprising information relating to the plurality of appliance controllers in the local environment, the first local knowledge set including a plurality of entries, each entry of the plurality of entries corresponding to a unique appliance controller of the plurality of appliance controllers, each entry including: a demand model associated with the unique appliance controller; and a demand category associated with the unique appliance controller, the demand category being one of a plurality of predetermined demand categories corresponding to different degrees of demand flexibility; B) periodically monitoring the first power demand of the first appliance and a first demand category associated with the first appliance controller; C) periodically updating the first local knowledge set based on B); D) periodically receiving, at the first appliance controller, second local knowledge set from at least one of the plurality of appliance controllers other than the first appliance controller; E) periodically updating the first local knowledge set based on D); F) periodically broadcasting the first local knowledge set to the plurality of appliance controllers other than the first appliance controller; G) transmitting the first local knowledge set to the first meter controller; H) receiving a first control input at the first appliance controller; I) making a comparison, at the first appliance controller, of the first control input and the first demand category associated with the first appliance controller; and J) controlling the first power demand of the first appliance based on the comparison in I).

In accordance with a further embodiment of the invention, a method is provided for controlling at least a first power demand of a first appliance of a plurality of appliances operating in a first local environment, the first local environment and at least a second local environment constituting a city-wide environment to which power is supplied by a utility provider, the first appliance and at least some other appliances of the plurality of appliances being respectively associated with a corresponding appliance controller such that the first local environment includes a plurality of appliance controllers including a first appliance controller associated with the first appliance, the plurality of appliance controllers of the first local environment being in communication with a first meter controller associated with the first local environment. The method may comprise: A) maintaining at the first meter controller a first meter controller model based at least in part on a first local knowledge set received from the first appliance controller, the first meter controller model including a plurality of subtotal power demand values, each subtotal power demand value corresponding to a different one of a plurality of predetermined demand categories corresponding to different degrees of demand flexibility; B) maintaining at the first meter controller a first representative city-wide model based at least in part on the first meter controller model, the first representative city-wide model including a plurality of estimated mean per-consumer subtotal power demand values, each estimated mean per-consumer subtotal power demand value corresponding to a different one of the plurality of predetermined demand categories; C) maintaining at the first meter controller a first neighbor model set, the first neighbor model set comprising information relating to a plurality of meter controllers in the city-wide environment, the first neighbor model set including a plurality of neighbor models, each neighbor model of the plurality of neighbor models corresponding to a unique meter controller of the plurality of meter controllers; D) periodically receiving at the first meter controller at least one neighbor model from at least one of the plurality of meter controllers other than the first meter controller; E) periodically updating the first neighbor model set based on D); F) periodically updating the first representative city-wide model based on the first meter controller model and the first neighbor model set updated in E); G) periodically broadcasting the first representative city-wide model to the plurality of meter controllers other than the first meter controller; H) receiving at the first meter controller a present power demand and a target power demand for the city-wide environment; I) calculating at the first meter controller a first control input for the first local environment based at least in part on the target power demand and the first representative city-wide model, the first control input representing a requested degree of power demand reduction in the first local environment; and J) broadcasting the first control input to the plurality of appliance controllers.

It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein. It should also be appreciated that terminology explicitly employed herein that also may appear in any disclosure incorporated by reference should be accorded a meaning most consistent with the particular concepts disclosed herein.

BRIEF DESCRIPTION OF THE DRAWINGS

The drawings are not necessarily to scale, emphasis instead generally being placed upon illustrating the principles of the invention.

DETAILED DESCRIPTION

Figure 1:
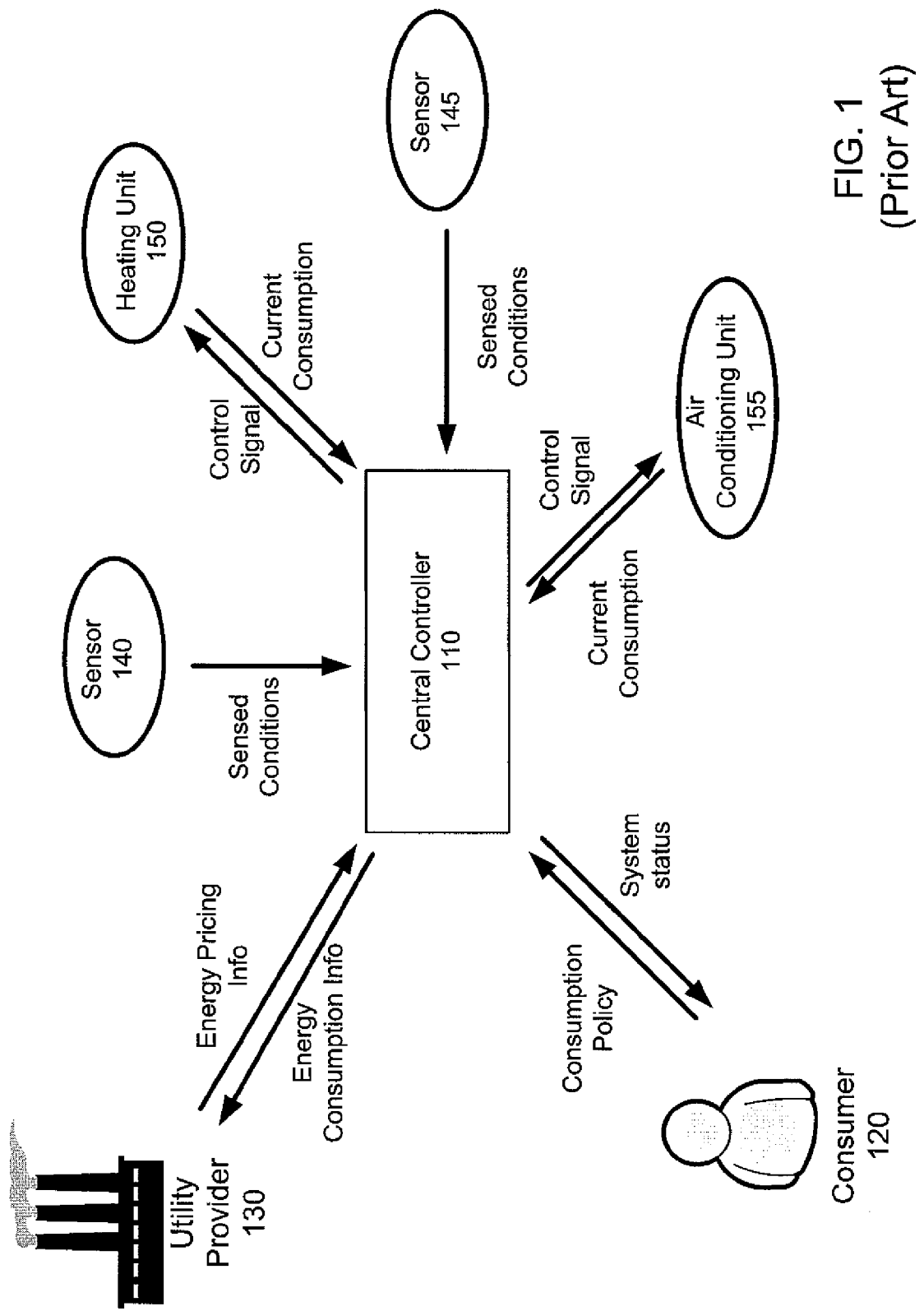
FIG. 1 illustrates an example of a conventional demand management system.

Applicants have appreciated that existing energy demand management systems have limited scalability because they employ a centralized controller for an entire control environment (e.g., a home or a commercial building). As illustrated in an exemplary conventional implementation shown in FIG. 1, all of the information processing and decision making is concentrated at the centralized controller 110. As the control environment expands (e.g., to include more sensors and heating/cooling units), more processing capabilities are needed at the centralized controller 110 in order to handle the increase in computational complexity. In some applications (e.g., small residential homes), the associated increase in costs may discourage consumers from adopting such a system.

Applicants have also appreciated that most existing energy demand management systems focus on heating and/or cooling applications and cannot be easily adapted to control appliances other than heating/cooling units. Among the few existing systems that do allow a consumer to control the power consumption of generic appliances, a priority list of appliances is typically used for specifying the order in which the appliances will be turned off in case of a power shortage. These techniques require a high level of involvement from the consumer, both at the initial setup and during continued maintenance (e.g., when new appliances are added or when changes need to be made to existing appliances). They have also been limited to applications in a single building, at least for the lack of a practical implementation of a priority list of appliances at a city or neighborhood level.

Applicants have further appreciated that conventional market-based systems for controlling energy demand may have unintended negative effects such as creating social inequalities. For example, wealthy consumers may not have sufficient incentive to reduce non-essential consumption even during peak consumption periods. On the other hand, consumers truly in need of basic consumption may not be able to afford energy during peak consumption periods due to the increase in prices. Absent additional means to distinguish basic needs from non-essential consumption, such social inequalities may be unavoidable in a market-based system.

I. Overview

In view of the foregoing, one embodiment of the invention relates generally to a decentralized demand management system that allows a consumer to categorize energy consuming appliances based on multiple levels of demand flexibility. For example, an essential appliance, such as a life-supporting medical device, may be assigned to a "critical" category so that its power supply is guaranteed at all times. On the other hand, a non-essential appliance, such as decorative lighting, may be assigned to an "optional" category and its power supply may be disrupted when the power grid is under strain. Any number of intermediate categories may exist between these two extremes, allowing respective consumers to express their preferences in a highly flexible manner according to some predetermined metric that may be adopted in uniform fashion, even across an entire city or neighborhood.

In accordance with another embodiment of the invention, an appliance controller is provided to control the power demand of one or more appliances coupled to the appliance controller. The appliance controller may be built into a generic appliance such as a refrigerator or washing machine, or it may be a stand-alone device configured to be plugged into a conventional power outlet to convert the conventional outlet into a controlled outlet. The appliance controller may be further adapted to measure the amount of power being consumed by the one or more appliances coupled to the appliance controller.

In one embodiment, the appliance controller may provide a simple interface that allows a consumer to specify a level of demand flexibility for the appliances coupled to the appliance controller. The interface may comprise a dial or a multi-setting switch for specifying the level of demand flexibility. It may further comprise an override button or switch to allow the consumer to temporarily override the specified level of demand flexibility.

In a further embodiment, the appliance controller may comprise a communication interface for receiving a control input indicative of a degree to which reduction in power demand is requested for a given consumer. Upon receiving the control input, the appliance controller may determine whether the power demand of the appliances connected thereto is to be reduced based on the control input and the level of flexibility specified by the consumer for the appliances.

In a further embodiment, the appliance controller may be configured to communicate with other appliance controllers associated with a given consumer. The collection of appliance controllers associated with a given consumer may form a local network and the appliance controllers may share power demand information with each other within the local network.

In accordance with a further embodiment of the invention, a meter controller is provided to process the power demand information received from one or more appliance controllers associated with a given consumer. For example, the meter controller may compute a power demand subtotal for each level of demand flexibility for an entire local environment (e.g., the home of the consumer). The meter controller may be further coupled to the utility meter of the local environment to obtain additional power demand information (e.g., the amount of power being consumed by uncontrolled appliances).

In some embodiments, the meter controller may be part of a wider network of meter controllers and may share power demand information with other meter controllers. This information sharing may be done to enable each meter controller to obtain a summary view of the global state of power demand across an entire city or neighborhood. Techniques may be employed to ensure that the summary view at each meter controller is a sufficiently close approximation of the true global state at any point in time, in spite of possible communication errors and/or delays in the wider network. In one embodiment, the summary view may comprise mean per-consumer power demand subtotals for the different levels of demand flexibility.

It should be appreciated that the phrase "consumer," as used throughout this disclosure, refers generally to an entity that requires power. For example, a consumer may be a human being and a local environment associated with the consumer may be the home of the consumer. A consumer may also be a non-human entity such as a business or a hospital, and a local environment associated with the consumer may be one or more buildings owned and/or operated by the consumer. However, the invention is not limited to these or other examples of consumers and local environments.

In some further embodiments, a given meter controller coupled to one or more appliance controllers may receive from a demand controller demand information indicative of a degree to which global reduction in power demand is requested by the demand controller. Based on this information, and the summary view of the global state of power demand across the entire city or neighborhood, the meter controller may determine a degree of reduction in power demand to be imposed within its associated local environment. A control input may then be provided to the appliance controllers in the local environment, so that the power demand of the controlled appliances may be adjusted accordingly.

Following below are more detailed descriptions of various concepts related to, and embodiments of, inventive methods and apparatus according to the present invention for energy demand management. It should be appreciated that various concepts introduced above and discussed in greater detail below may be implemented in any of numerous ways, as the disclosed concepts are not limited to any particular manner of implementation. Examples of specific implementations and applications are provided primarily for illustrative purposes.

II. Appliance Controllers

Figure 2A:
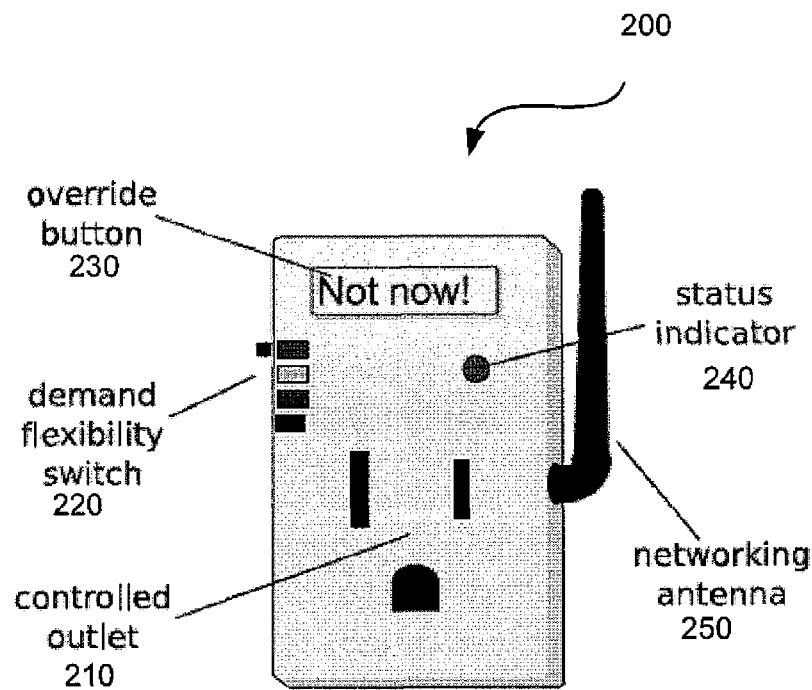
FIGS. 2A and 2B show an illustrative example of an appliance controller in accordance with one embodiment of the invention.
Figure 2B:
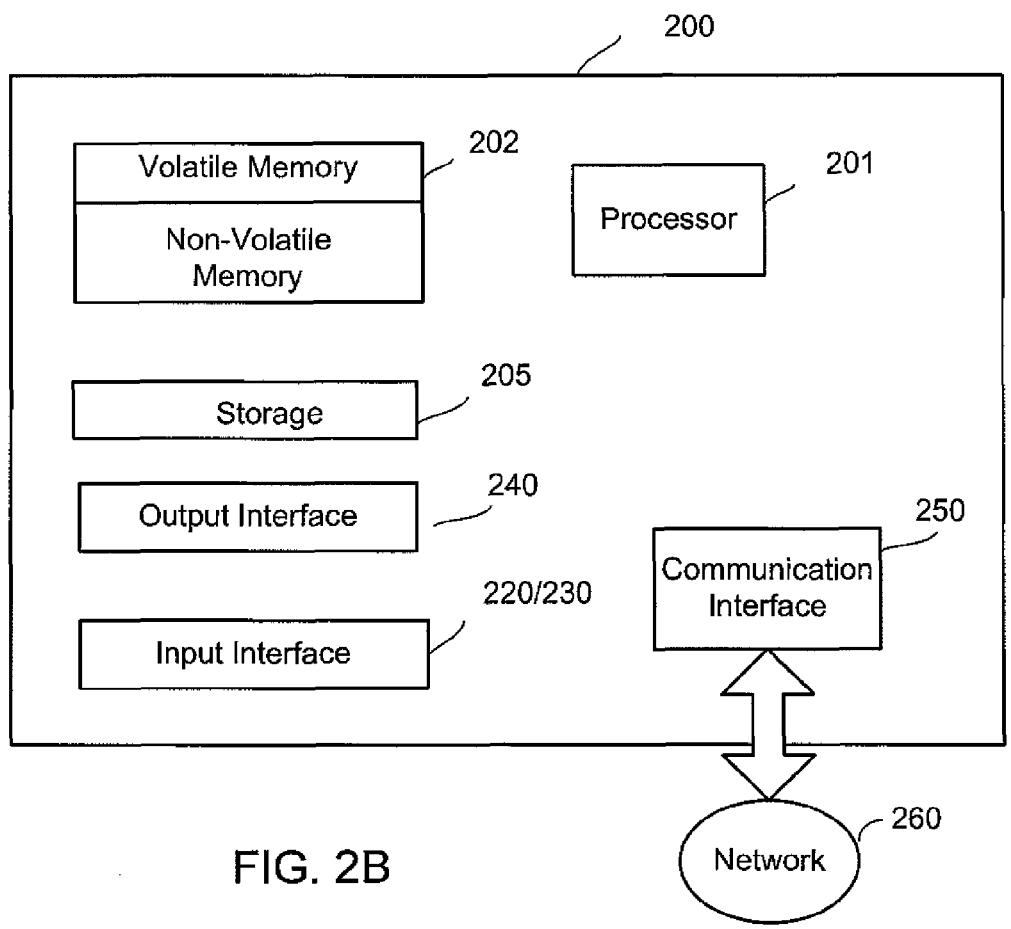

FIGS. 2A and 2B show an illustrative example of an appliance controller 200 in accordance with one embodiment of the invention. In this embodiment, the appliance controller 200 is a stand-alone device configured to be coupled to a conventional power outlet to convert the conventional outlet into a controlled outlet 210. However, as mentioned above, other embodiments are also contemplated. For example, the appliance controller may be built into a generic appliance, such as a refrigerator or washing machine, or it may be coupled to a conventional light switch or dimmer. As a further alternative, the appliance controller may be integrated into a new power outlet and/or light control to be installed in the structure of a building.

When an appliance is plugged into the controlled outlet 210, the appliance controller 200 may form part of the electrical circuit between the appliance and the underlying conventional outlet, so that it may measure the amount of power being consumed by the appliance and also disrupt the supply of power to the appliance when appropriate.

The appliance controller may provide a simple interface that allows a consumer to specify a level of demand flexibility for the one or more appliances plugged into the controlled outlet 210. In this embodiment, the interface comprises a multi-setting switch 220 for specifying the level of demand flexibility. However, it should be appreciated that other suitable interfaces, such as a dial, a slider, and/or a set of buttons may also be used for specifying the level of demand flexibility.

In the embodiment shown in FIG. 2A, there are four demand categories corresponding to four different levels of demand flexibility. To make the interface more intuitive for a consumer, these categories may be associated with different colors suggestive of the nature of the categories, as follows:

Green: Optional. Appliances in this category may be turned off at any time.

Yellow: Flexible. Appliances in this category may be turned off when the power grid is under strain.

Red: Important. Appliances in this category may be turned off only during emergencies.

Black: Critical. Appliances in this category may never be turned off.

Of course, any other colors may be used to denote the different exemplary demand categories provided above. Also, the invention is not limited to any specific number of demand categories. For example, the level of demand flexibility may be specified on a continuous scale, e.g., by means of a dial, in which case there may be infinitely many demand categories. In general, it should be appreciated that a wide variety of different metrics, with different degrees of granularity/resolution, may be employed according to various embodiments of the present invention to allow a consumer to select, via any of a variety of user interfaces, a level of demand flexibility for one or more appliances coupled to the controlled outlet 210. In fact, the level of demand flexibility need not be expressed numerically and may have a more complex structure. For example, a level of consumption flexibility may be expressed as a probability distribution function.

The appliance controller 200 may further comprise one or more features that allow the consumer to temporarily override a specified level of demand flexibility. As shown in FIG. 2A, in one exemplary implementation an override button 230 is provided such that, when the override button 230 is activated, the appliances coupled to the appliance controller may not be turned off, regardless of grid conditions. As discussed in greater detail below, the override button 230 may be deactivated automatically after a certain amount of time has elapsed. Alternatively, the override button may be deactivated expressly by the consumer.

The appliance controller 200 may further comprise a status indicator to display status information to the consumer. In the embodiment shown in FIG. 2A, the status indicator is a binary light emitting device (LED) indicator 240 that allows the consumer to quickly discern whether the controlled outlet is currently supplying power. However, other types of indicators, such as a liquid crystal display (LCD), may also be suitable when additional information (e.g., a power demand history for the controlled appliances) is to be displayed to the consumer.

As discussed above, the appliance controller 200 may further comprise a communication interface for receiving a control input and/or communicating with other appliance controllers associated with the same consumer. In the embodiment shown in FIG. 2A, the communication interface comprises a networking antenna 250 suitable for low-power short-range radio communication, and any accompanying components (not shown in FIG. 2A) to facilitate receiving and transmitting signals. Any short-range radio communication protocols may be used, including, but not limited to, Bluetooth and ZigBee. The invention is also not limited to the use of wireless communication. For example, the appliance controller may communicate with another appliance controller via the power line using a suitable protocol such as x10. Communication via the power line may be employed instead of, or in addition to, communication over a wireless link.

Additionally, the appliance controller 200 may communicate with one or more computing devices, such as personal computers, associated with the consumer so that the consumer may monitor and/or configure multiple appliance controllers in a consolidated manner.

FIG. 2B is a schematic illustration of some of the hardware components of the appliance controller 200. The demand flexibility switch 220 and override button 230 of FIG. 2A are shown in FIG. 2B as part of an input interface of the appliance controller 200. Similarly, the status indicator 240 of FIG. 2A is shown as part of an output interface and the networking antenna is shown as part of a communication interface to one or more networks 260.

As illustrated in FIG. 2B, the appliance controller 200 may further comprise at least one processor 201 to process available information, such as the power consumption measured at the controlled outlet 210, the level of demand flexibility specified by the consumer through the switch 220, and/or any information received via the communication interface. The processor 201 may determine, as a result of the processing, whether the power demand of the appliances coupled to the appliance controller 200 should be modified (e.g., whether the appliances should be turned on or off at any given point in time, or whether the appliances' duty cycles should be shifted in time). The information processing, and the subsequent determination, may take place via one or more routines executed by the processor 201 (e.g., processor-executed methods). As discussed in greater detail below, some of these routines may be part of one or more distributed algorithms executed collectively by the collection of appliance controllers and/or meter controllers within a local environment (e.g., a residential or commercial building).

The appliance controller 200 may further comprise a memory 202 that may include both volatile and non-volatile memory. The memory 202 may store one or more instructions to program the processor 201 to perform any of the functions described herein. The appliance controller 200 may further comprise a storage 205 (e.g., one or more disk drives) in addition to the system memory 202.

For the purpose of illustration, the general functionality of an appliance controller (e.g., routines executed by the appliance controller) may be placed into two general categories. A first category, herein referred to as a "local modeling loop," may be executed to enable information sharing among appliance controllers within the local environment. A second category, herein referred to as a "local control loop," may be executed to enable control inputs to reach all appliance controllers in the local environment. The local modeling loop is discussed below in connection with FIGS. 3-5, and the local control loop is discussed later in connection with FIGS. 14-19.

III. Local Modeling Loop

Figure 3:
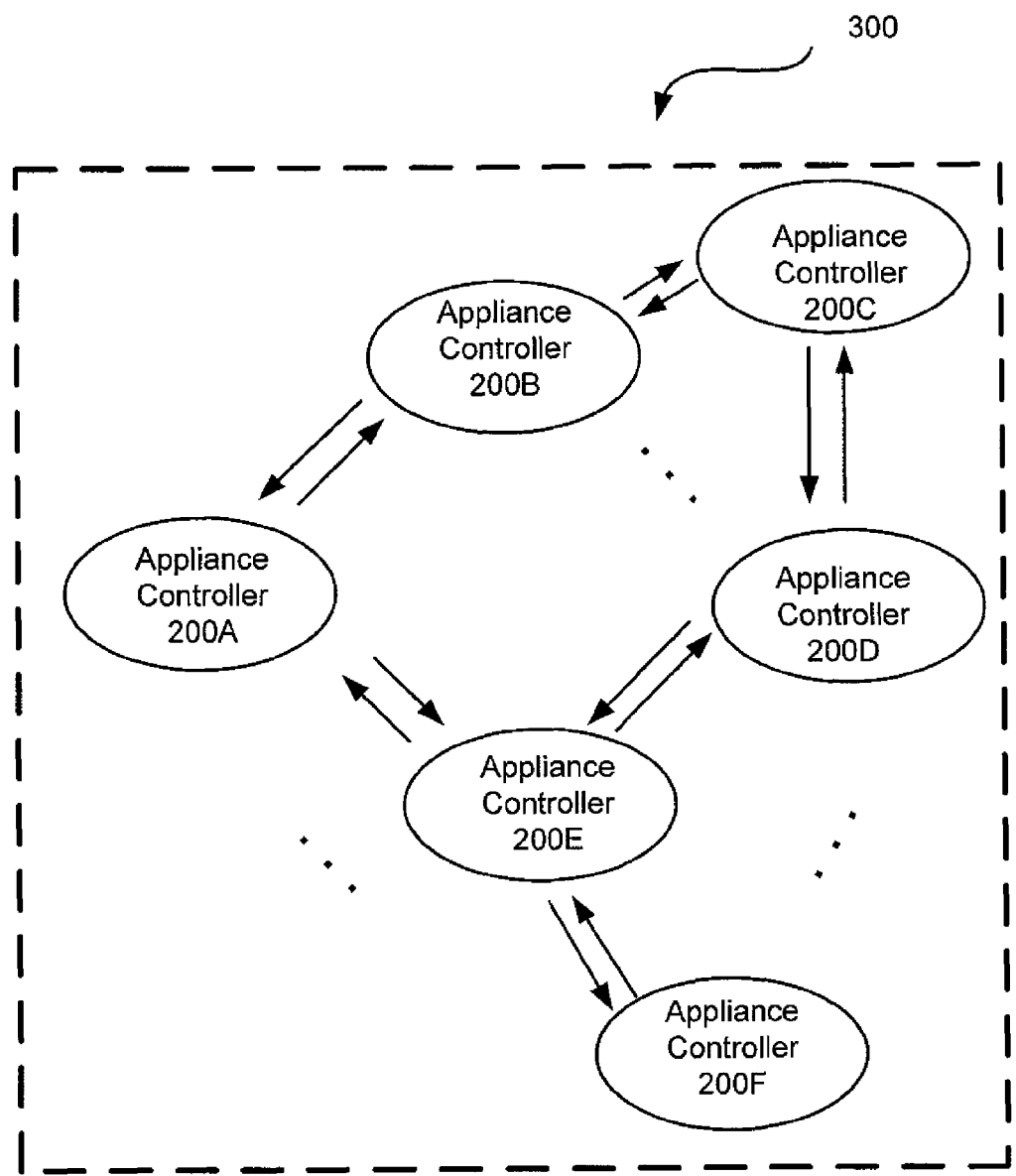
FIG. 3 illustrates an example of a local environment, comprising a plurality of appliance controllers.

FIG. 3 illustrates an example of a local environment 300, comprising a plurality of appliance controllers 200A-F as discussed above in connection with FIGS. 2A and 2B. Depending on the underlying methods of communication (e.g., wireless and/or via power lines), each appliance controller may establish a communication link with one or more other appliance controllers. For example, the appliance controller 200A may have a direct communication link with each of the appliance controllers 200B and 200E, and the appliance controller 200F may have a direct communication link with the appliance controller 200F only. Nonetheless, information originating from the appliance controller 200A may reach the appliance controller 200F via a number of different routes in the network, e.g., via the appliance controller 200E. Generally, it should be appreciated that the present invention is not limited to any particular number of appliance controllers in the local environment 300, nor any particular network topology for the local environment 300.

For completeness, it should be appreciated that in a networked environment such as that depicted in FIG. 3, at least some of the communication links between the appliance controllers 200A-F may be occasionally unreliable, in the sense that they may introduce unpredictable message delays or even drop messages entirely. The overall topology of the network may also change dynamically. For example, new appliance controllers may be added and/or existing appliance controllers may be removed. Also, a communication link between two existing appliance controllers may be added or removed.

In one embodiment, the appliance controllers may participate in a local modeling loop, which enables information to propagate throughout the local environment 300. The information being propagated may comprise power demand information and/or demand category information regarding appliances controlled by the appliance controllers. However, it should be appreciated that the invention is not limited to any specific type of information being propagated between appliance controllers in the local environment 300.

Figure 4:
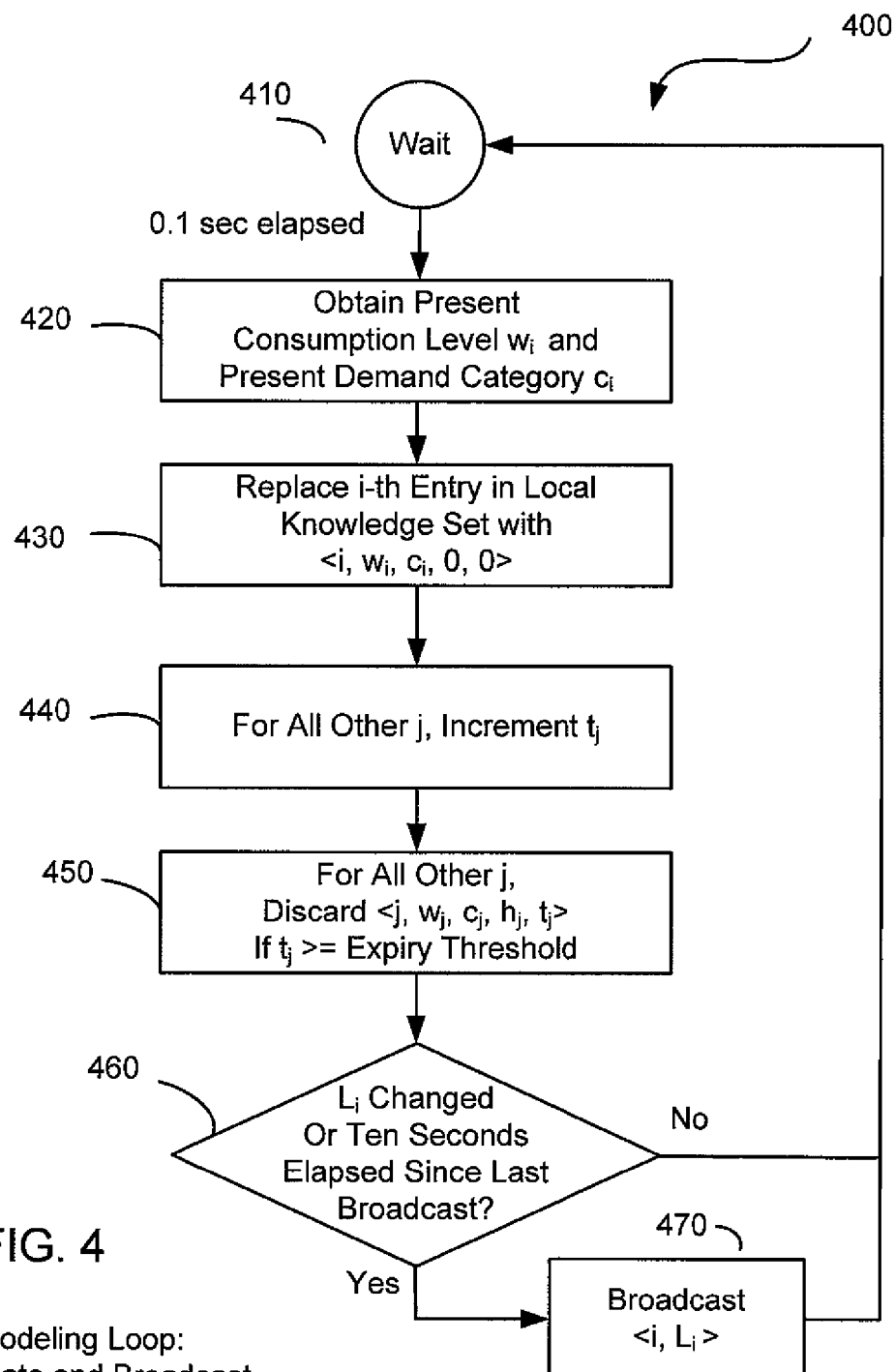
FIG. 4 illustrates a process that may be performed by an appliance controller participating in a local modeling loop in accordance with one embodiment of the invention.

FIG. 4 illustrates an example of a process 400 that may be performed by an appliance controller participating in a local modeling loop. Since the local modeling loop is executed collectively by a plurality of appliance controllers, a suitable identification system may be used to differentiate between the different appliance controllers. For example, each appliance controller may be associated with a unique 128-bit integer identifier i. However, it should be appreciated that the invention is not limited to any particular identification system, nor to the use of identifiers at all.

In one exemplary implementation, the process 400 may be encoded as processor executable instructions and may be stored in a memory, such as the memory 202 of the appliance controller 200 shown in FIG. 2B. When these instructions are executed by the processor 201, they perform the acts of the process 400 shown in FIG. 4.

At least some of the acts of the process 400 may be performed by an appliance controller i on a continual or periodic basis. For example, the entire process 400 may be repeated every 0.1, 0.5, 1, 5, 10 or 60 seconds. The process 400 may also be triggered by incoming events instead of, or in addition to, being repeated periodically. Examples of incoming events may include receiving an input from a user, detecting a change in power demand, and/or receiving a broadcast message. Generally, the frequency at which the process 400 is performed may depend on the size and/or topology of the network of appliance controllers in the local environment 300 and may be chosen to maximize the accuracy and freshness of available information without exceeding the computational capabilities of the appliance controller i or the communication capabilities of the appliance controller i and/or the network of appliance controllers in the local environment 300.

In the embodiment shown in FIG. 4, the process 400 is repeated periodically. The process 400 may enter a "Wait" state 410 and stay there until some predetermined amount of time (e.g., 0.1 seconds) has elapsed since the latest entry into the "Wait" state 410. Alternatively, the process 400 may stay in the "Wait" state until some predetermined amount of time (e.g., 0.1 seconds) has elapsed since its last exit from the "Wait" state 410.

After the appropriate amount of time has elapsed, the process 400 proceeds to act 420 to obtain up-to-date information pertaining to one or more appliances controlled by the appliance controller i. For example, the appliance controller i may comprise a suitable means (such as a current meter) for measuring power consumption of the controlled appliances, and a present consumption level $w_i$ may be obtained therefrom. In addition, the appliance controller i may comprise an interface (e.g., the switch 220 of FIG. 2A) through which a consumer may specify a demand category for the controlled appliances. A present value $c_i$ of the specified demand category may also be obtained.

The appliance controller i may also maintain a local knowledge set $L_i$ comprising all of the information it has collected from other appliance controllers in the local environment 300. For example, the local knowledge set may be a set of tuples each having the form $<j, w_j, c_j, h_j, t_j>$, where j is a 128-bit integer identifier for a given appliance controller, $w_j$ is a 64-bit IEEE floating point number representative of a power consumption level, and $c_j$ is an 8-bit integer representative of a demand category. The other components of the tuple, $h_j$ and $t_j$, may also be 8-bit integers and are further discussed below.

Each tuple $<j, w_j, c_j, h_j, t_j>$ may reflect the knowledge of the appliance controller i about an appliance controller j; as such, a local knowledge set $L_i$ at a given appliance controller may comprise as many tuples as there are appliance controllers in a given local environment. In case i=j, the tuple $<j, w_j, c_j, h_j, t_j>$ reflects the present state of the appliance controller i itself. As discussed in greater detail below, the appliance controller i may receive broadcasts from other appliance controllers and may use the received information to update the tuples $<j, w_j, c_j, h_j, t_j>$. The appliance controller i may also continually broadcast the entire updated local knowledge set $L_i$ to the network of appliance controllers in the local environment 300, as a way of further propagating the information it has accumulated. Since every appliance controller participating in the local modeling loop may maintain its own local knowledge set and perform the same type of periodic updates and broadcasts, each piece of information originating from one appliance controller may eventually reach all other appliance controllers.

It should be appreciated that the tuples $<j, w_j, c_j, h_j, t_j>$ are merely one example of the type of information that may be collected and maintained in a local knowledge set $L_i$. Other types of information instead of, or in addition to, these tuples may also be maintained. For example, instead of, or in addition, to the present power consumption $w_j$, the local knowledge set $L_i$ may comprise a more complex model of the power demand of the one or more appliances coupled to the appliance controller j. For example, such a demand model may contain information on the duty cycles of the appliances.

Regarding other elements of a given tuple of the local knowledge set $L_i$, the component $h_j$ may be a hop count associated with the information from the appliance controller j (in this case, $w_j$ and $c_j$). As mentioned above in connection with FIG. 3, a pair of appliance controllers may communicate with each other indirectly via another appliance controller. The hop count may reflect the number of appliance controllers through which the information has traveled until it reaches the present appliance controller. For example, for the present state (e.g., $w_i$ and $c_i$) of the appliance controller i, the hop count $h_i$ may be set to 0 because the information has originated from the appliance controller i itself. On the other hand, for $w_j$ and $c_j$ where the appliance controller j has a direct communication link with the appliance controller i, the hop count $h_j$ may be set to 1.

Generally, information associated with a lower hop count may be considered more reliable than information associated with a higher hop count, because it has traveled less distance in the network. Thus, in this embodiment, the hop count is used as a measure of the reliability of the received information. When different versions of the same information are received at an appliance controller, the version with a higher hop count may be discarded. This may allow the appliance controller to minimize the amount of storage required to maintain the information, by keeping only the "best" version according to an appropriate measure (in this case, the hop count).

Similarly, the component $t_j$ may be a timestamp that serves as a measure of "freshness" associated with the information from the appliance controller j (in this case, $w_j$ and $c_j$) and may be used to eliminate information that is too old. For example, $t_j$ may be incremented periodically by the appliance controller i and the entire tuple $<j, w_j, c_j, h_j, t_j>$ may be discarded when $t_j$ reaches a certain expiry threshold, e.g., 150. Both the updating frequency and the expiry threshold may be chosen in any suitable way, as the invention is not limited in these respects. For example, they may be chosen in accordance with the size and/or topology of the network of appliance controllers in the local environment 300, to account for an expected transit delay of the messages.

It should be appreciated that both the hop count and the timestamp described above are examples of techniques for improving the accuracy of the information maintained and used by the appliance controllers. For instance, when an appliance controller is no longer present in the network, other appliance controllers may need to remove information pertaining to the departed appliance controller in a timely fashion. Other techniques for improving information accuracy may also be suitable, such as those described in the publication "Fast Self-Healing Gradients" by Jacob Beal et al., Proceedings of the ACM Symposium on Applied Computing, March 2008, which publication is hereby incorporated by reference herein.

Returning to FIG. 4, after obtaining demand information about the controlled appliances at act 420, the process 400 may proceed to update the local knowledge set $L_i$. At act 430, the i-th entry in the local knowledge set $L_i$ may be replaced with a new tuple $<i, w_i, c_i, 0, 0>$. As discussed above, the hop count $h_i$ is set to 0 because the information has originated from the appliance controller i itself. The timestamp $t_i$ is also set to 0 because the information has been freshly obtained at act 420.

Then, the process 400 proceeds to act 440 to increment the timestamp $t_j$ by 1 for all j different from i, after which the process 400 discards at act 450 any tuple $<j, w_j, c_j, h_j, t_j>$ whose timestamp $t_j$ has reached a suitable expiry threshold, e.g., 150.

After these updates, the process 400 checks at act 460 whether any information in the local knowledge set $L_i$ other than timestamps has changed or a certain amount of time (e.g., 10 seconds) has elapsed since the last broadcast to the network. If so, the process 400 broadcasts at act 470 the local knowledge set $L_i$, together with the identifier i, to other appliance controllers in the local environment 300, and then the process 400 returns to the "Wait" state 410. If, on the other hand, the determination at act 460 is negative, then the process 400 omits the broadcast and returns directly to the "Wait" state 410.

In this embodiment, the check at act 460 is implemented to reduce the number of broadcast messages when there are no changes to the local knowledge set $L_i$. This may prevent flooding in the network (i.e., a condition in which the network ceases to function properly because messages are injected at an excessively high rate). Other techniques for preventing flooding, or no such techniques at all, may also be employed, as the invention is not limited in this respect. In addition, the check at act 460 in this embodiment ensures that broadcasts occur regularly (e.g., every 10 seconds) even when the local knowledge set $L_i$ is not changing, so that other appliance controllers in the network is aware that the appliance controller i is still "alive." This broadcast frequency may be chosen to achieved a desired balance between the need to prevent flooding and the need to ensure propagation of fresh and accurate information.

Figure 5:
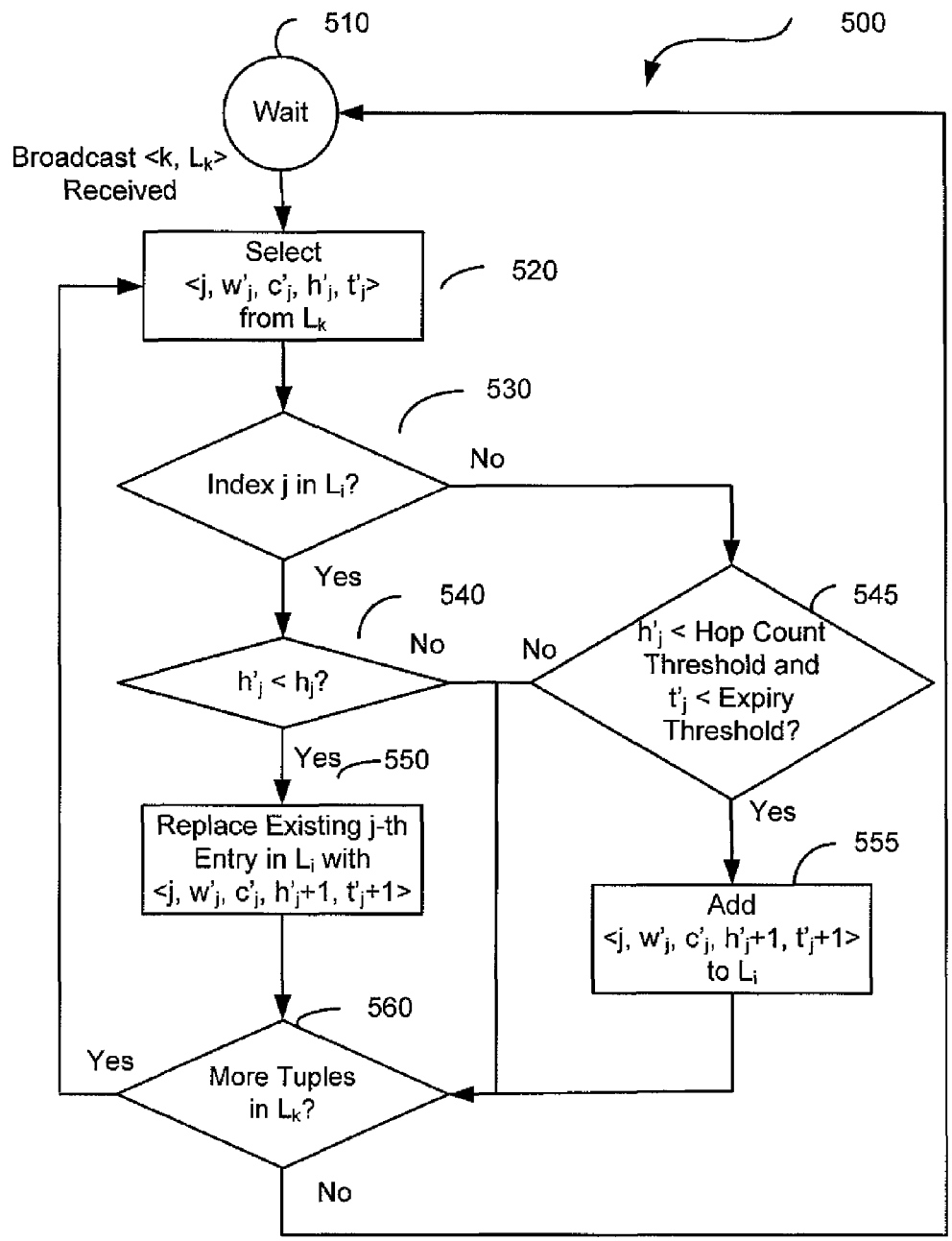
FIG. 5 illustrates a process that may be performed by an appliance controller to process a broadcast message received from another appliance controller via a local modeling loop in accordance with one embodiment of the invention.

FIG. 5 illustrates an example of a process 500 that may be performed by the appliance controller i to process a broadcast message <k, $L_k$> received from an appliance controller k via the local modeling loop. Upon receiving the message, the process 500 may exit a "Wait" state 510 and proceed to process each of the tuples <j, $w'_j$, $c'_j$, $h'_j$, $t'_j$> in the received knowledge set $L_k$.

At act 520, the process 500 selects an unprocessed tuple <j, $w'_j$, $c'_j$, $h'_j$, $t'_j$> from $L_k$. Then, at act 530, it is determined whether the index j is already represented in the local knowledge set $L_i$ in a tuple <j, $w_j$, $c_j$, $h_j$, $t_j$>. If yes, the process 500 proceeds to act 540 to compare the hop counts $h'_j$ and $h_j$. As discussed above, a lower hop count may indicate more reliable information, and therefore the existing j-th entry may be replaced at act 550 with a new tuple <j, $w'_j$, $c'_j$, $h'_j+1$, $t'_j+1$> when it is determined that $h'_j$ is less than $h_j$. The new hop count may be incremented by one because one more appliance controller (i.e., appliance controller i) has been traversed. The new time stamp may also incremented by a suitable amount (e.g., one), because some amount of time has elapsed since the knowledge set $L_k$ is transmitted by the appliance controller k.

When it is determined at act 540 that $h'_j$ is no less than $h_j$, the process 500 determines that the existing j-th entry is more reliable than the received tuple and proceeds directly to act 560 to determine whether there are unprocessed tuples in the received knowledge set $L_k$.

When it is determined at act 530 that the index j is not represented in any tuple in the local knowledge set $L_i$, the process 500 proceeds to act 545 determine whether $h'_j$ is below a certain hop count threshold (e.g., 20) and $t'_j$ is below a certain expiry threshold (e.g., 150). These checks may be performed to ensure that the information is fresh and reliable before it is added to the local knowledge set $L_i$. However, the invention is not limited to the use of these checks, nor to the particular thresholds above. Any suitable thresholds may be used and may be chosen in accordance with the size and/or topology of the network of appliance controllers.

When it is determined at act 545 that the information is both fresh and reliable, a new tuple <j, $w'_j$, $c'_j$, $h'_j+1$, $t'_j+1$> is added to the local knowledge set $L_i$ at act 555, with the hop count and timestamp incremented as discussed above in connection with act 550. When instead it is determined at act 545 that the information is either not fresh or not reliable, the process 500 proceeds directly to act 560 to determine whether there are unprocessed tuples in the received knowledge set $L_k$.

When it is determined at act 560 that one or more tuples in the received knowledge set $L_k$ remain to be processed, the process 500 returns to act 520 to select another tuple for processing. Otherwise, the process 500 returns to the "Wait" state 510 until the next broadcast message is received.

IV. Meter Controllers

The local modeling loop exemplified in FIGS. 3-5 allows information about each appliance/appliance controller to propagate through a network of appliance controllers within a local environment. In accordance with some further embodiments, discussed in greater detail below, at least one meter controller is provided to process the propagated information relating to a given local environment and ultimately control the appliance controller(s) in the local environment, for example, pursuant to demand modification requests from a utility provider.

Figure 6A:
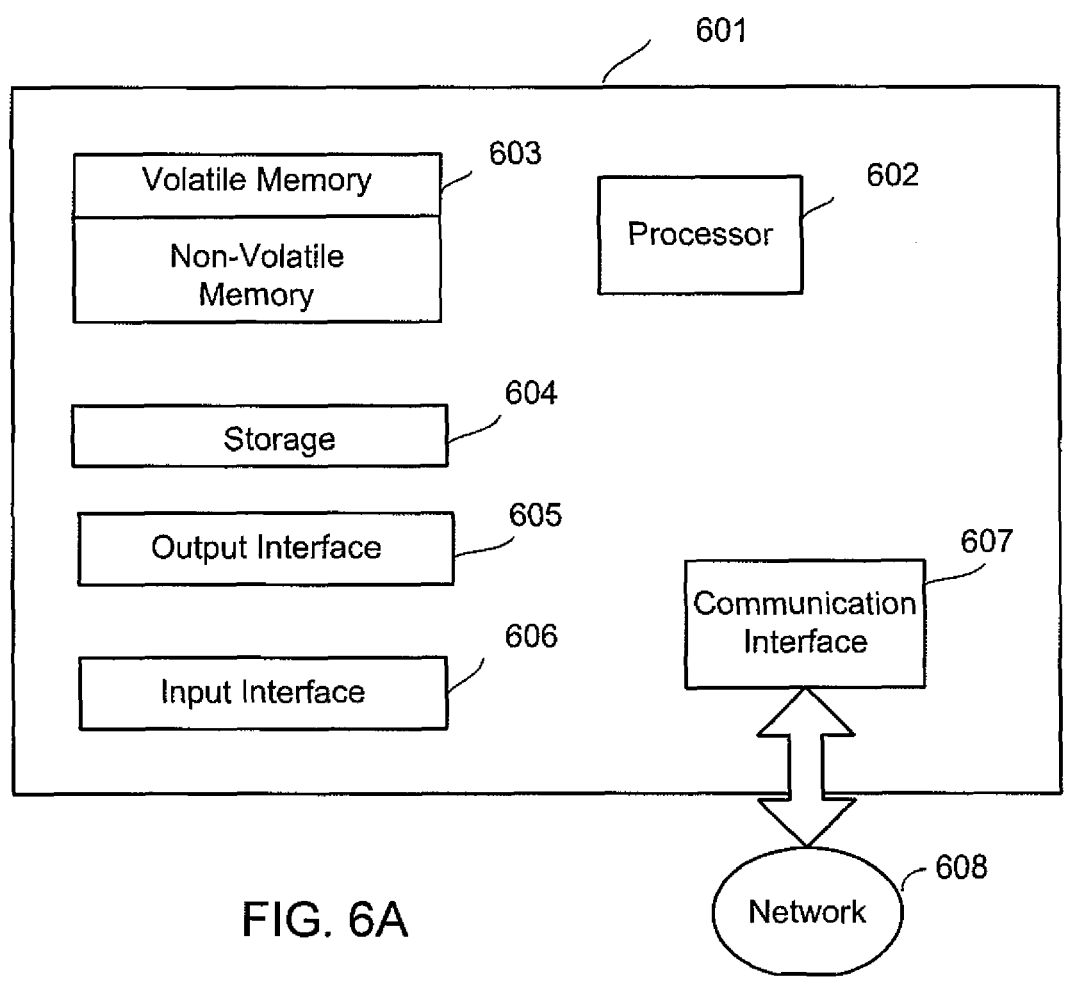
FIG. 6A is a schematic illustration of a meter controller associated with a local environment in accordance with one embodiment of the invention.

The meter controller may be any device adapted to process information, an example of which is illustrated schematically in FIG. 6A. The meter controller 601 shown in FIG. 6A comprises at least one processor 602 to process available information, such as information received via a communication interface 607 coupled to a network 608. In one embodiment, the network 608 may be the same network via which appliance controllers communicate with each other. The processor 602 may be adapted to execute one or more instructions stored in a memory 603, which may include both volatile and non-volatile memory. When executed by the processor 602, the instructions may perform a processing of power demand information. An example of such a process is discussed in greater detail below in connection with FIG. 6C.

The meter controller 601 may further comprise a storage 604 (e.g., one or more disk drives) in addition to the system memory 603, as well as an input interface 604 and an output interface 605. Together, the input interface 604 and the output interface 605 may form an interface through which a user may interact with the meter controller 601. For example, the meter controller 601 may display information regarding the power demand of the local environment. As discussed below, the meter controller may also have access to information regarding the power demand of a city-wide environment and/or demand flexibility of other consumers. Such information may also be displayed to facilitate comparisons.

Figure 6B:
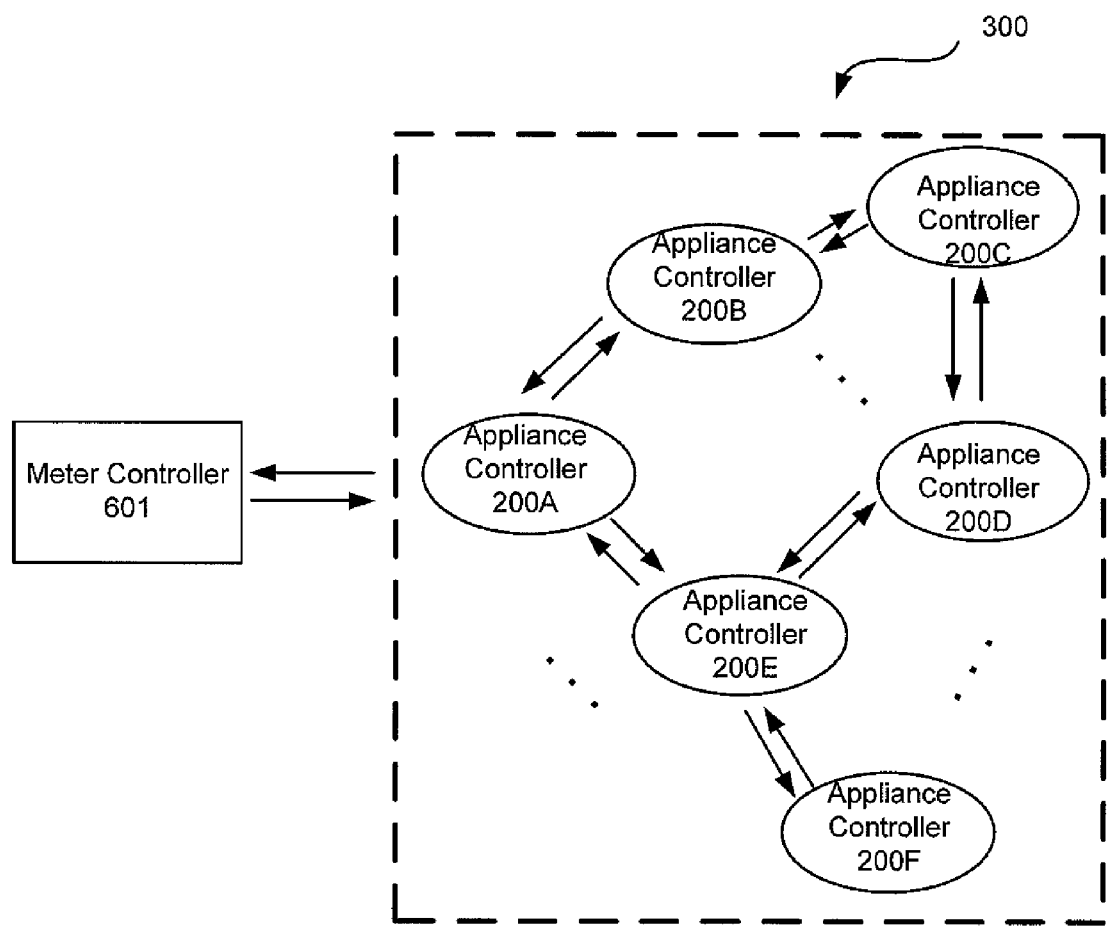
FIG. 6B illustrates the meter controller of FIG. 6A serving as a gateway to the local environment in accordance with one embodiment of the invention.

In one embodiment, the meter controller may be an appliance controller that executes additional routines aside from those for the local modeling loop. In a further embodiment, the meter controller may be a device coupled to the utility meter of the local environment so that it may obtain additional power demand information (e.g., the amount of power being consumed by uncontrolled appliances in the local environment). Other embodiments may also be possible, as set forth below. In general, a given meter controller may be viewed as a "gateway" to a given local environment comprising multiple appliance controllers and corresponding appliances. For example, as shown in FIG. 6B, the meter controller 601 may serve as a gateway to the local environment 300 comprising appliance controllers 200A-F participating in a local modeling loop.

The meter controller may participate in the local modeling loop, either fully or partially. For example, when the meter controller is itself an appliance controller that controls one or more appliances, it may participate in the local modeling loop fully by updating and broadcasting information periodically. Alternatively, the meter controller may act as a mere "listener," that is, it may update its local knowledge set as broadcast messages are received, without transmitting any broadcast messages of its own. In yet another embodiment, the meter controller may receive and transmit broadcast messages, but it does not maintain any information pertaining to its own controlled appliances (e.g., when it is not controlling any such appliances at all). It is also possible that the meter controller does not participate in the local modeling loop. Instead, it may receive information from an appliance controller that does participate in the local modeling loop.

Figure 6C:
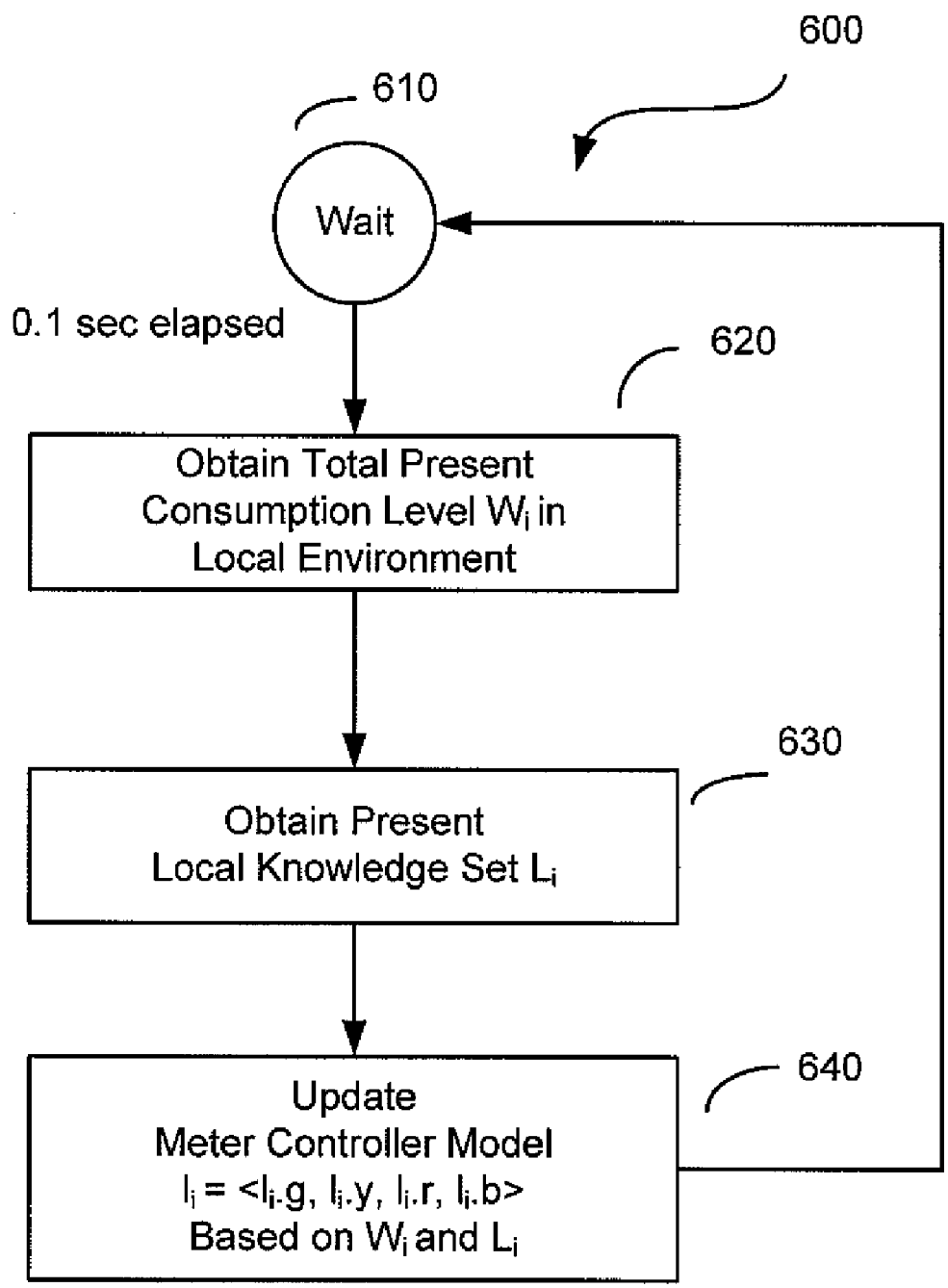
FIG. 6C illustrates a process that may be performed by a meter controller to process information provided by a local modeling loop in accordance with one embodiment of the invention.

FIG. 6C illustrates an example of a process 600 that may be performed by a meter controller to process information provided by the local modeling loop. As discussed above, the invention is not limited to any particular manner in which the information is provided.

In this embodiment, the meter controller is identified by a suitable identifier i, which may be of a same or different type as the identifiers used for appliance controllers. For example, when the meter controller is itself an appliance controller, the same type of identifier may be used. As discussed below, the identifier i may also be used for communication in a wider network comprising a plurality of meter controllers.

The process 600 may comprise a plurality of acts performed by the meter controller i on a continual or periodic basis. As discussed above in connection with FIG. 4, the frequency at which the process 600 is performed may be chosen to maximize the accuracy and freshness of available information without exceeding the computational capabilities of the meter controller i or the communication capabilities of the meter controller i and/or the network of the local environment 300. In the embodiment shown in FIG. 6C, the process 600 may enter a "Wait" state 610 and stay there until some predetermined amount of time (e.g., 0.1 seconds) has elapsed since the latest entry into the "Wait" state 610. Then the process 600 proceeds to obtain information updates.

The meter controller i may have access to total power demand information for the local environment 300, e.g., including both controlled and uncontrolled appliances. For example, the meter controller i may store a value $W_i$ reflecting the total power consumption in the local environment 300 and obtain an update for $W_i$ at act 620. The value $W_i$ may be provided in a number of different ways, as the invention is not limited in this regard. For example, the meter controller i may be coupled to a utility meter of the local environment 300 and may be adapted to measure total power consumption. Alternatively, the meter controller may be configured to receive total power consumption information from a suitable source, such as the utility meter. In addition, the value $W_i$ may be the actual measured/received total power consumption value, or an estimate value obtained by applying an exponential filter to a sampled power consumption signal. The exponential filter may smooth out short-term bursts in the sampled signal, so that the value $W_i$ may provide a better indication of the present state of total power consumption of the local environment. The exponential filter may have a suitable parameter $\alpha$ that is chosen to achieve a desired balance between smoothing and responsiveness. For example, in one embodiment, the parameter $\alpha$ may be 0.98.

In one embodiment, the information maintained by the meter controller i may also include a local knowledge set $L_i=\{<j, w_j, c_j, h_j, t_j>\}_j$, and the meter controller i may obtain an update for $L_i$ at act 630. As discussed above, the meter controller i may update $L_i$ by participating in the local modeling loop, or the meter controller i may receive updates for $L_i$ from a suitable source such as an appliance controller participating in the local modeling loop. Other suitable methods may also be employed to update $L_i$.

The meter controller i may process the information it maintains and compile a summary view of the current power demand state of the local environment. The summary view may be compiled in any suitable way and may contain any suitable type of information, as the invention is not limited in this regard. For example, the summary view may comprise a subtotal power consumption value for each demand category c corresponding to a given level of demand flexibility. The subtotal may be obtained by summing the power consumption values $w_j$ for all indices j represented in $L_i$ such that $c_j=c$. The resulting sum may reflect the subtotal power consumption for all controlled appliances belonging to demand category c in the local environment 300. In general, the summary view may be obtained by combining the information contained in the local knowledge set $L_i$ using one or more suitable operators.

In one embodiment, there may be four demand categories: green, yellow, red and black, as discussed above in connection with FIG. 2A. The summary view computed by the meter controller i may comprise a meter controller model $l_i=<l_i\cdot g, l_i\cdot y, l_i\cdot r, l_i\cdot b>$, where each component of $l_i$ reflects the subtotal power consumption for all controlled appliances in the local environment 300 belonging to the respective demand category.

In the embodiment shown in FIG. 6C, the meter controller model $l_i$ may be updated at act 640 based on the updated version of the local knowledge set $L_i$ obtained in act 630. Additionally, the component $l_i\cdot b$ corresponding to the critical category (e.g., "black") may be adjusted by adding the difference $W_i-(l_i\cdot g+l_i\cdot y+l_i\cdot r+l_i\cdot b)$. This difference may reflect the amount of power being consumed by uncontrolled appliances, which may be considered critical for practical purposes, because they cannot be turned on or off by the present demand management system. Finally, after the meter controller model $l_i$ has been updated, the process 600 returns to the "Wait" state 610.

V. City-Wide Modeling Loop

In accordance with some further embodiments of the invention, the meter controller i may be part of a wider network of meter controllers and may share power demand information (e.g., the meter controller model $l_i$) with other meter controllers. This information sharing may be done to enable each meter controller to obtain a representative view of the global state of power demand across an entire city or neighborhood. This sharing and maintenance at each meter controller of a representative view of the global state may in turn enable the meter controllers to make decisions on demand modification in a decentralized, but fair, manner. For instance, each meter controller may be able to make decisions on demand modification using only information that is available to the meter controller. In addition, the decentralized decisions, taken as a whole across the entire city or neighborhood, may be fair or equitable in the sense that they do not favor or disfavor any particular consumer or group of consumers. For example, the decisions may not lead to a situation in which reduction is imposed on a consumer or group of consumers for a disproportionate amount of time compared to other consumers in the city or neighborhood.

Various techniques may be employed to ensure that the representative view at each meter controller is a sufficiently accurate representation of the true global state at any point in time, in spite of possible communication errors and/or delays in the wider network. For example, the meter controllers may participate in one or more distributed algorithms to share information, so that each meter controller may compute a sufficiently accurate representative view based on the information it receives. Such a distributed algorithm is herein referred to as a "city-wide modeling loop."

It should be appreciated that the term "city" is used herein to refer generally to a utility service area comprising a plurality of consumers, and similarly for the term "neighborhood." A city or neighborhood need not be geographically contiguous, and may be of any suitable size.

Figure 7:
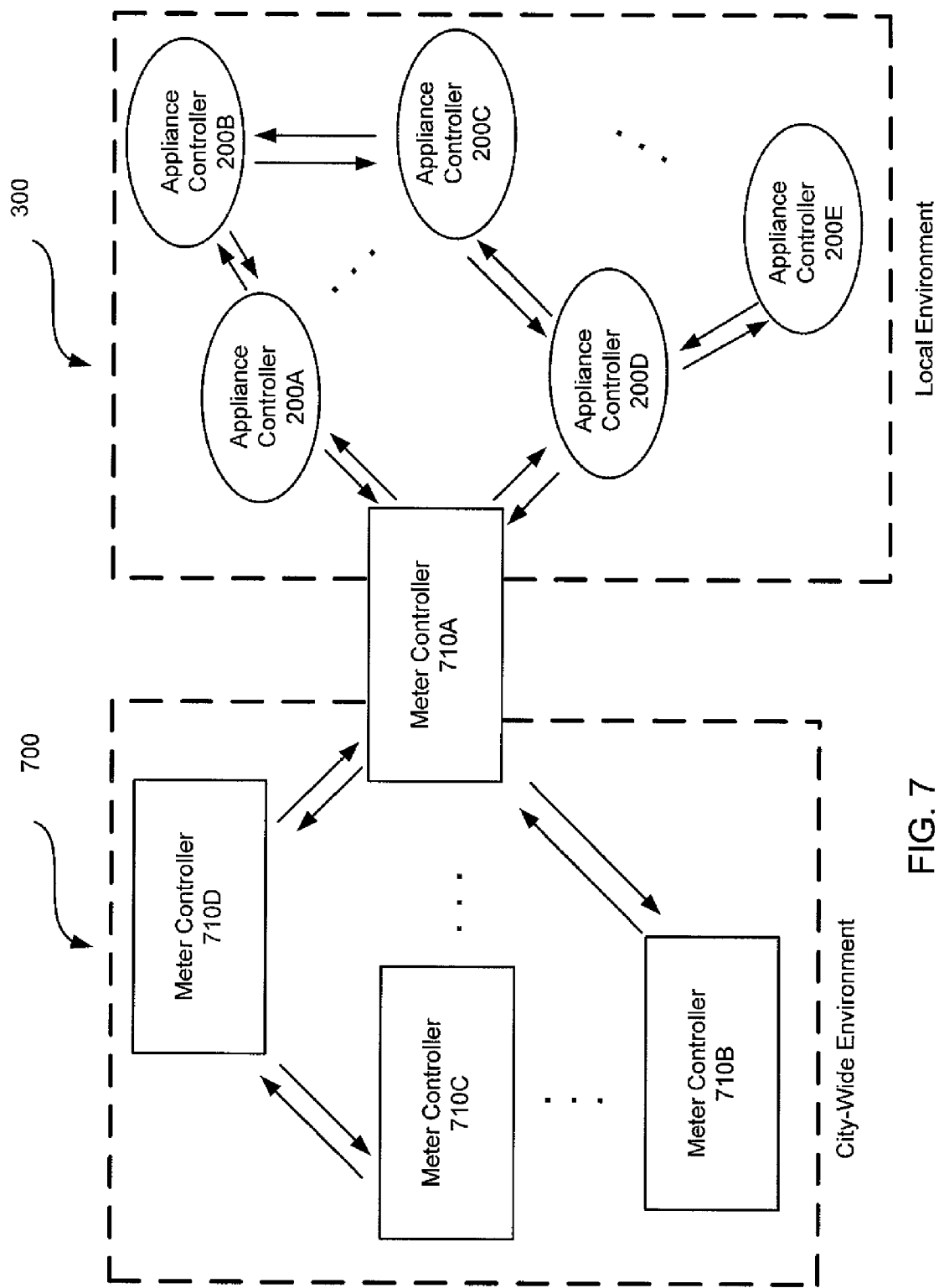
FIG. 7 illustrates a meter controller that is in communication with multiple appliance controllers of a local environment, and that is also part of a city-wide environment comprising a plurality of meter controllers, in accordance with one embodiment of the invention.

FIG. 7 illustrates an example of a meter controller 710A that is in communication with multiple appliance controllers 200A-E of a local environment 300, and that is also part of a city-wide environment 700 comprising meter controllers 710A-D. Since meter controllers may be located farther apart from each other (e.g., on different city blocks), longer range communication technologies (e.g., WiMAX) may be employed for the city-wide modeling loop. In addition, the underlying physical network interconnecting multiple meter controllers may be wired, wireless, or a combination thereof, as the invention is not limited in this respect.

In the embodiment shown in FIG. 7, the meter controller 710 also participates in the local modeling loop of its local environment 300, together with appliance controllers 200A-E. It may use information obtained via the local modeling loop (e.g., the local knowledge set $L_i$) in conjunction with information received from the city-wide modeling loop discussed below to compute a representative view of the global state of power demand of the city-wide environment 700. For example, it may use the summary view of the local state of power demand (i.e., the power demand state of the local environment 300), as obtained by process 600 of FIG. 6C.

Although not shown explicitly in FIG. 7, it should be appreciated that each of meter controllers 710B-D may also be associated with a respective local environment comprising a plurality of appliance controllers.

Figure 8:
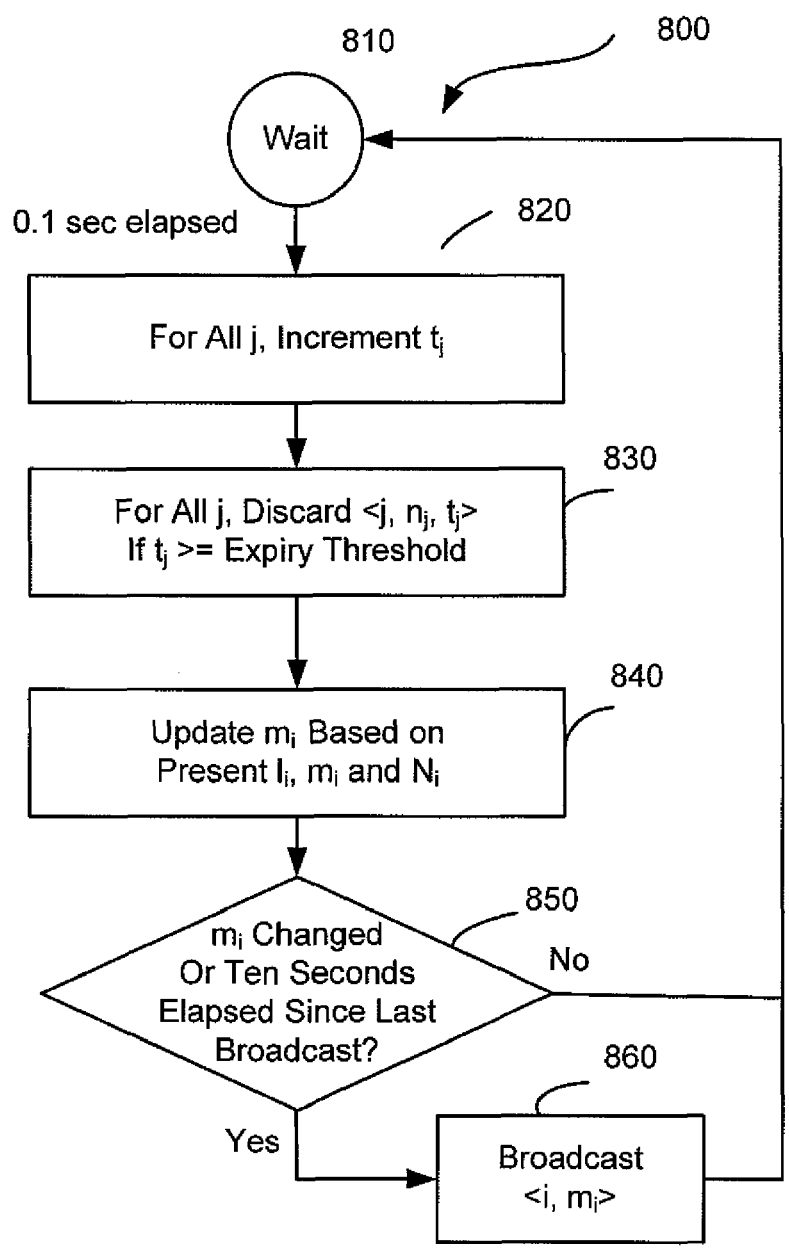
FIG. 8 illustrates a process that may be performed by a meter controller participating in a city-wide modeling loop in accordance with one embodiment of the invention.

Further details of the city-wide modeling loop are now described in connection with FIGS. 8 and 9. FIG. 8 illustrates an example of a process 800 that may be performed by a meter controller participating in a city-wide modeling loop. As discussed above, the meter controller may be associated with an index i that may be of a same or different type as the identifiers used for appliance controllers.

The meter controller i may construct and maintain a representative view of the global state of power demand of the city-wide environment 700. In one embodiment, the representative view may comprise one or more statistics of the state of power demand at a typical consumer, such as estimated mean per-consumer power consumption subtotals for the different demand categories. For example, the representative view may be a representative model $m_i = \langle m_i \cdot g, m_i \cdot y, m_i \cdot r, m_i \cdot b \rangle$, where $m_i \cdot g$, $m_i \cdot y$, $m_i \cdot r$ and $m_i \cdot b$ are estimated mean per-consumer power consumption subtotal for the categories green, yellow, red and black, respectively. However, it should be appreciated that the representative view may comprise other types of information instead of, or in addition to, estimated mean per-consumer power consumption subtotals, as the invention is not limited in this respect. For example, the representative view may comprise an estimated power consumption subtotal across all consumers for each demand category.

In one embodiment, the meter controller i may also maintain a neighbor model set $N_i$ comprising all of the information it has collected from other meter controllers in the city-wide environment 700. For example, the neighbor model set $N_i$ may be a set of tuples of the form $\langle j, n_j, t_j \rangle$, where j is a 128-bit integer identifier, $n_j$ is a tuple of 64-bit IEEE floating point numbers, and $t_j$ is an 8-bit integer. The tuple $n_j$, also called a neighbor model, may be of the form $\langle n_j \cdot g, n_j \cdot y, n_j \cdot r, n_j \cdot b \rangle$ and may be the representative model computed by a meter controller j. The integer $t_j$ may be a timestamp associated with the neighbor model $n_j$ to measure its "freshness."

By participating in the city-wide modeling loop, the meter controller i may receive broadcasts from other meter controllers and may use the received information to update the tuples $\langle j, n_j, t_j \rangle$ as well as its own representative model $m_i$. The meter controller i may also continually broadcast $m_i$, as a way to further propagate the information it has accumulated.

Returning to FIG. 8, the process 800 may comprise a plurality of acts performed by the meter controller i on a continual or periodic basis. As discussed above in connection with FIG. 4, the frequency at which the process 800 is performed may be chosen to maximize the accuracy and freshness of available information without exceeding the computational capabilities of the meter controller i or the communication capabilities of the meter controller i and/or the network of meter controllers in the city-wide environment 700. In the embodiment shown in FIG. 8, the process 800 may enter a "Wait" state 810 and stays there until some predetermined amount of time (e.g., 0.1 seconds) has elapsed since the latest entry into the "Wait" state 810.

After the predetermined amount of time has elapsed, the process 800 proceeds to act 820 to increment the timestamp $t_j$ by 1 for all tuples $\langle j, n_j, t_j \rangle$ in $N_i$. At act 830, the process 800 discards any tuple $\langle j, n_j, t_j \rangle$ whose timestamp $t_j$ has reached an expiry threshold, e.g., 150. This may ensure that only "fresh" information is maintained and used by the meter controller i. However, it should be appreciated that the invention is not limited to the use of timestamps to ensure freshness of information, as other mechanisms may also be suitable. Also, when timestamps are used, the updating frequency and the expiry threshold may be chosen in any suitable way.

Then, the process 800 proceeds to act 840 to update the representative model $m_i$. In this embodiment, the update is performed using the meter controller model $l_i = \langle l_i \cdot g, l_i \cdot y, l_i \cdot r, l_i \cdot b \rangle$ provided by the local modeling loop, the present version of the representative model $m_i$ and the neighbor model set $N_i$ updated in acts 820 and 830. For example, a new value for $m_i \cdot g$ may be computed as follows.

$$l_i \cdot g + \sum_{\langle j, n_j, t_j \rangle \in N_i} (n_j \cdot g - m_i \cdot g)$$

New values for $m_i \cdot y$, $m_i \cdot r$ and $m_i \cdot b$ may be computed in a similar fashion.

Having thus updated the representative model $m_i$, the process 800 may check at act 850 whether $m_i$ has changed or a certain amount of time (e.g., 10 seconds) has elapsed since the last broadcast to the city-wide environment 700. If so, the process 800 broadcasts at act 860 the representative model $m_i$ together with the identifier i and then returns to the "Wait" state 810. If, on the other hand, the determination at act 850 is negative, then the process 800 omits the broadcast and returns directly to the "Wait" state 810. As discussed above in connection with FIG. 4, the broadcast frequency (e.g., every 10 secs) may be chosen to achieved a desired balance between the need to prevent flooding in the network and the need to propagate fresh and accurate information.

To reduce the amount of broadcast traffic in the city-wide environment 700, the process 800 may alternatively check, at act 850, whether the representative model $m_i$ has changed significantly since the last broadcast to determine whether a next broadcast should be performed at act 860. For example, a next broadcast may be performed only if at least one component of the representative model $m_i$ has changed by a magnitude greater than a predetermined threshold magnitude (e.g., a change of more than 0.001) since the last broadcast. However, it should be appreciated that the invention is not limited to the use of these illustrative techniques, or any techniques at all, for reducing broadcast traffic.

Figure 9:
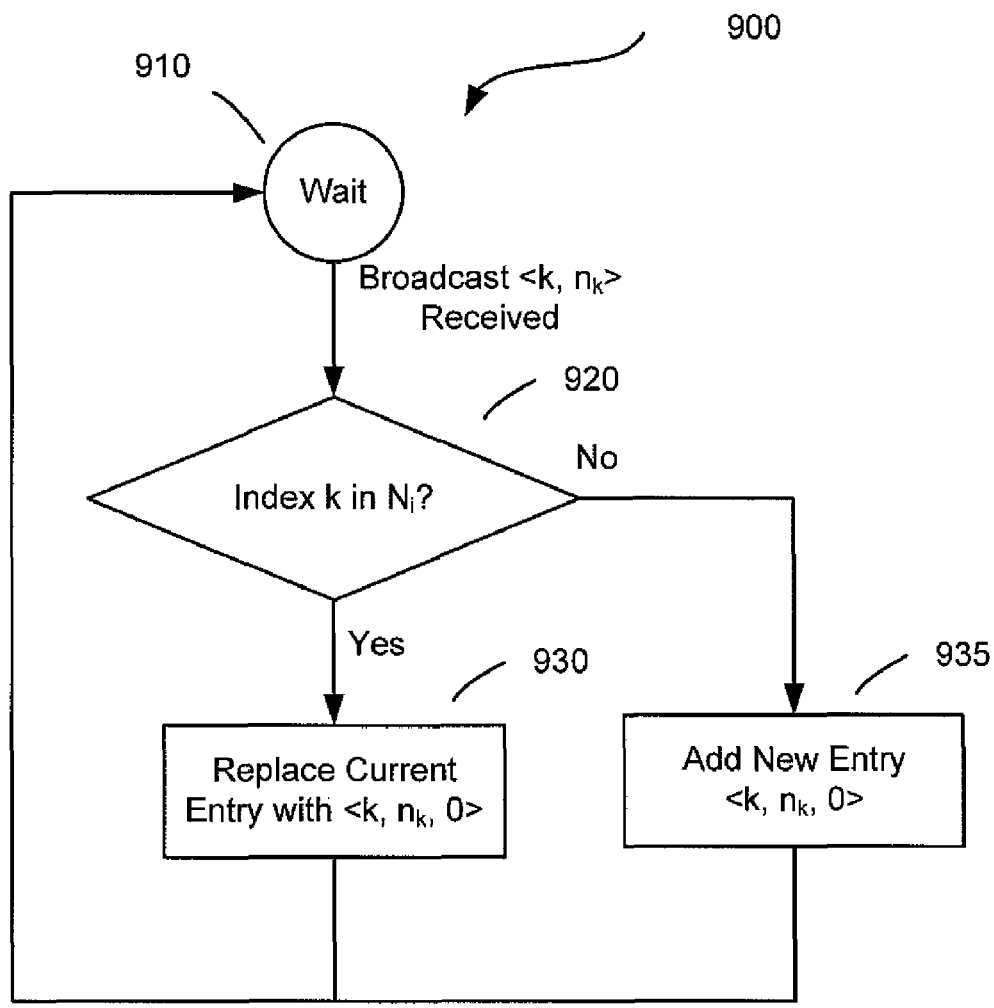
FIG. 9 illustrates a process that may be performed by a meter controller i to process a broadcast message received from another meter controller via a city-wide modeling loop, in accordance with one embodiment of the invention.

FIG. 9 illustrates an example of a process 900 that may be performed by the meter controller i to process a broadcast message $\langle k, n_k \rangle$ received from another meter controller k in the city-wide environment 700 and participating in the city-wide modeling loop. Upon receiving the message, the process 900 may exit a "Wait" state 910 and proceed to act 920, where the process 900 determines whether the index k is already represented in the neighbor model set $N_i$, that is, whether $N_i$ contains a tuple $\langle j, n_j, t_j \rangle$ with j=k. If yes, the process 900 proceeds to act 930 to replace the existing k-th entry in $N_i$ with a new tuple $\langle k, n_k, 0 \rangle$; otherwise, the process 900 proceeds to act 935 to add a new tuple $\langle k, n_k, 0 \rangle$ to $N_i$. Then, process 900 returns to the "Wait" state 910 until the next broadcast message is received.

The acts performed by processes 800 and 900 at each meter controller may allow the meter controllers to collectively update the information they maintain, so that each component of the representative model $m_i$ at each meter controller converges quickly (e.g., exponentially in time) to the mean per-consumer power consumption subtotal for the respective demand category. The rate of convergence may be a constant value determined by the graph Laplacian of the network of meter controllers in the city-wide environment 700, even in the case of unreliable communication and/or dynamic changes in network topology.

VI. Utility Control Loop

In some further embodiments of invention, the city-wide environment 700 may comprise at least one demand controller associated with an entity (e.g., a utility provider) that oversees power consumption within the city-wide environment 700. The demand controller may have access to grid information such as present power demand information for the city-wide environment 700 and/or target power demand information as specified by the utility provider. The demand controller may participate in a distributed algorithm, herein referred to as a "utility control loop," together with the meter controllers in the city-wide environment 700, so as to propagate among the meter controllers demand information indicating a degree to which global reduction in power demand is requested by the utility provider. However, it should be appreciated that the invention is not limited to the presence of a demand controller. The meter controllers may instead participate in the utility control loop without a demand controller and derive a target demand model (e.g., a target consumption level) in a distributed fashion.

Using the demand information provided by the utility control loop and the representative view of the global state of power demand provided by the city-wide modeling loop, each meter controller may be able to determine a demand modification (e.g., a degree of reduction in power demand or a shift of duty cycles) to be imposed within its associated local environment. A control input may then be provided to the appliance controllers in the local environment (via an appliance controller's communication interface, e.g., interface 250 as shown in FIG. 2B), so that the power demand of the controlled appliances may be modified accordingly.

Figure 10:
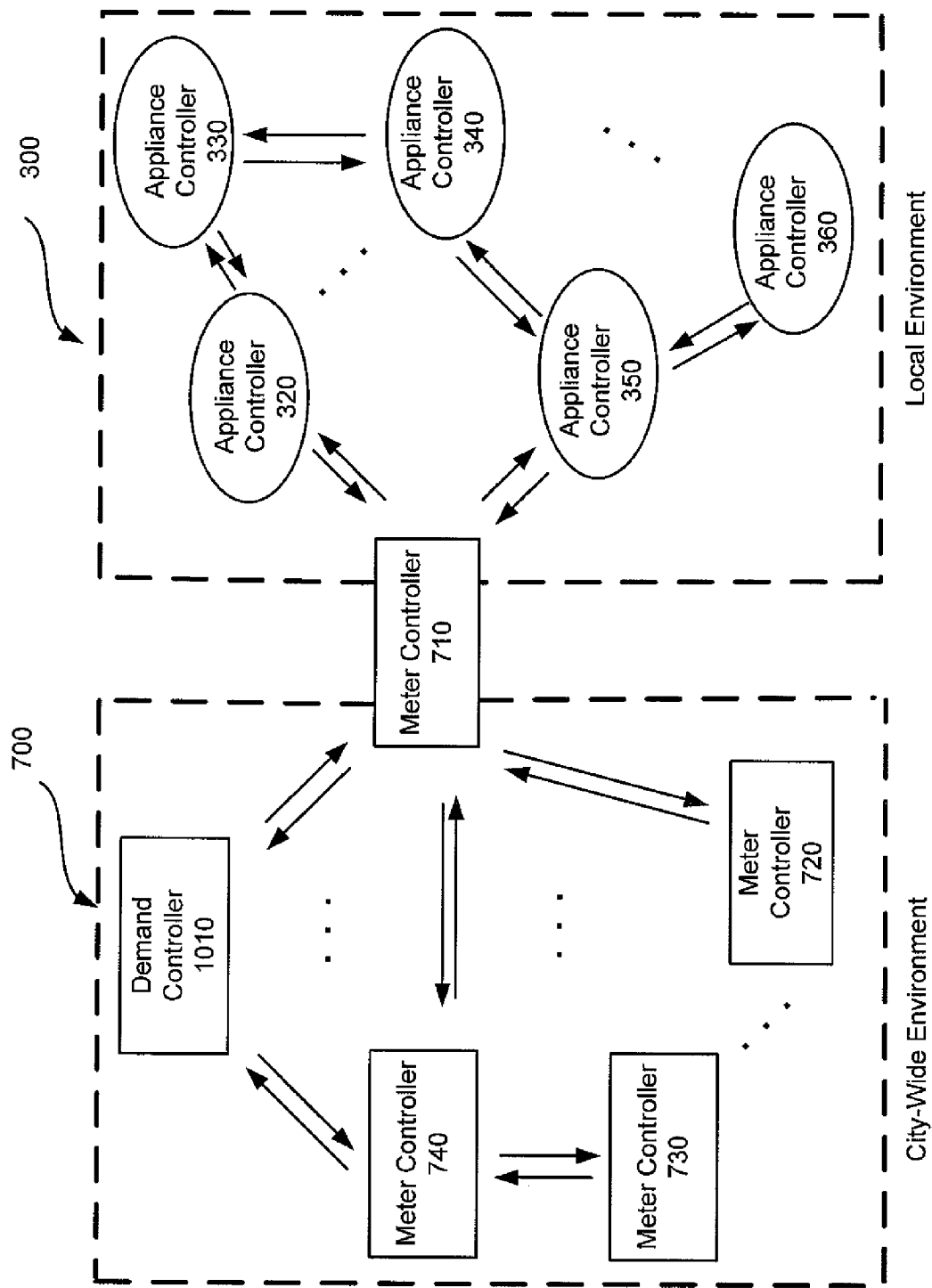
FIG. 10 illustrates a demand controller associated with a city-wide environment in accordance with one embodiment of the invention.

FIG. 10 illustrates an example in which the city-wide environment 700 comprises a demand controller 1010 in addition to meter controllers 710A-D. As discussed above, each of the meter controllers 710A-D may be associated with a local environment comprising a plurality of appliance controllers. An example of a local environment 300 is also shown in FIG. 10, which comprises appliance controllers 200A-E and is associated with the meter controller 710A. Using information supplied by the city-wide modeling loop (e.g., the representative model $m_i$) and information supplied by the utility control loop as discussed further below, the meter controller 710A may determine a degree of reduction in power demand to be imposed within the local environment 300 and provide a control input accordingly to the appliance controllers 200A-E. The control input may be propagated among the appliance controllers via a local control loop that is discussed in greater detail below in connection with FIGS. 14-19. Upon receiving this control input, each appliance controller may adjust accordingly the power demand of the appliances under its control.

Figure 11:
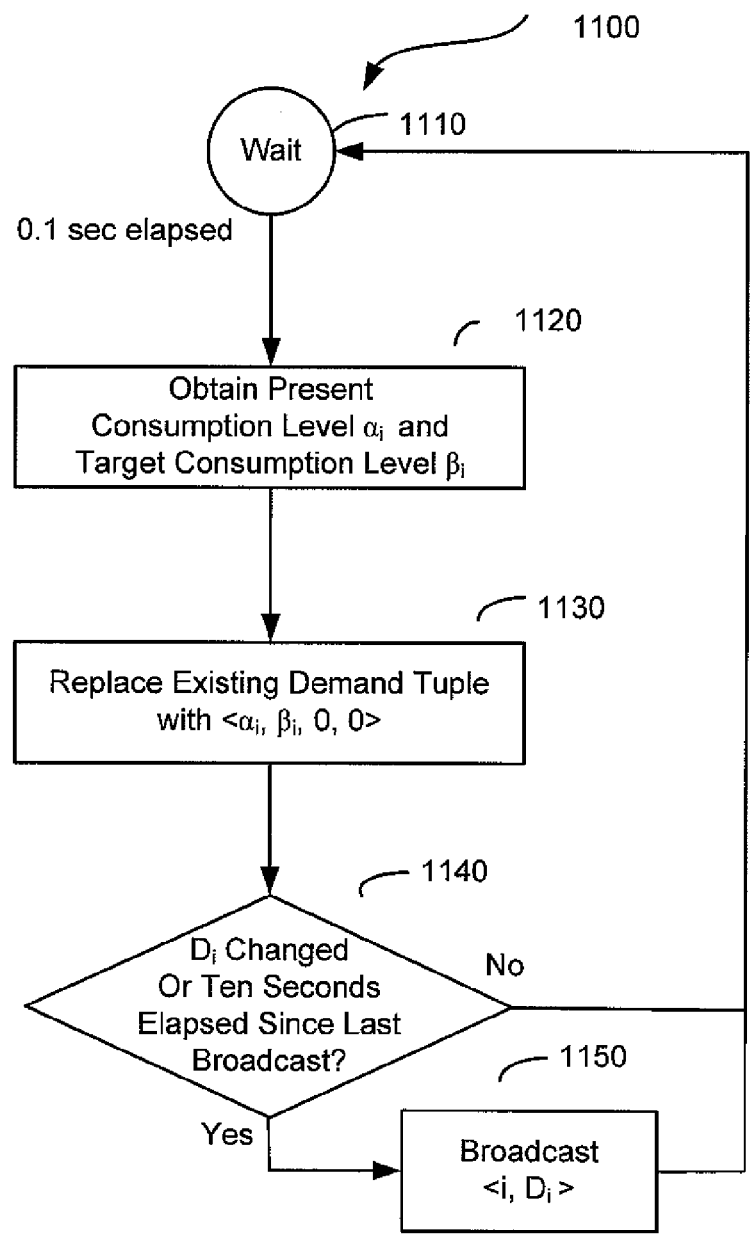
FIG. 11 illustrates a process that may be performed by a demand controller participating in a utility control loop in accordance with one embodiment of the invention.

FIG. 11 illustrates an example of a process 1100 that may be performed by a demand controller participating in a utility control loop. As with the meter controllers, the demand controller may be associated with an index i that may be of a same or different type as the identifiers used for appliance controllers. The index i may be used to distinguish the demand controller from the meter controllers and/or other demand controllers that may be present in the city-wide environment 700. Also, the demand controller may have any suitable architecture of hardware components, such as those shown in FIG. 2B and FIG. 6A.

As discussed above, the demand controller i may provide demand information to the meter controllers via the utility control loop. The demand information may be derived based on certain grid information that the demand controller i maintains in its state. In the embodiment shown in FIG. 11, the demand controller i maintains two values, $\alpha_i$ and $\beta_i$, reflecting respectively a present power consumption level and a target power consumption level for the city-wide environment. However, it should be appreciated that other types of grid information may be maintained instead of, or in addition to, $\alpha_i$ and $\beta_i$, as the invention is not limited in this respect. In addition, the grid information may be provided to the demand controller i in any suitable way. For example, it may be supplied by the associated utility provider.

In the embodiment shown in FIG. 11, the demand information provided to the meter controllers in the city-wide environment 700 via the utility control loop is the same as the grid information maintained by the demand controller i, namely, $\alpha_i$ and $\beta_i$. However, this is merely one embodiment. In other embodiments, the demand information may be of a different nature. For example, the demand information may comprise a ratio between $\alpha_i$ and $\beta_i$, rather than $\alpha_i$ and $\beta_i$ themselves. In general, the demand information may be a target demand model having any suitable structure and/or content.

The demand controller i may store the present power consumption level $\alpha_i$ and the target power consumption level $\beta_i$ in a demand tuple of the form $<\alpha_i, \beta_i, h_i, t_i>$, where $\alpha_i$ and $\beta_i$ are 64-bit IEEE floating point numbers, $h_i$ is a 32-bit integer representing a hop count, and $t_i$ is an 8-bit integer representing a timestamp. As discussed above in connection with the local modeling loop, the hop count and timestamp are used to indicate how reliable and/or fresh the demand information is. However, the invention is not limited to the use of these techniques.

Returning to FIG. 11, the process 11000 may comprise a plurality of acts performed by the demand controller i on a continual or periodic basis. As discussed above in connection with FIG. 4, the frequency at which the process 1100 is performed may be chosen to maximize the accuracy and freshness of available information without exceeding the computational capabilities of the demand controller i or the communication capabilities of the demand controller i and/or the network of the city-wide environment 700.

In the embodiment shown in FIG. 11, the process 1100 may enter a "Wait" state 1110 and stay there until some predetermined amount of time (e.g., 0.1 seconds) has elapsed since the latest entry into the "Wait" state 1110. Then, the process 1100 proceeds to act 1120 to obtain up-to-date grid information. In this embodiment, the grid information comprises a present power consumption level $\alpha_i$ and a target power consumption level $\beta_i$. As discussed above, other types of grid information may also be maintained, and may be obtained from any suitable source (e.g., the utility provider).

At act 1130, the process 1100 updates the demand tuple $D_i$ as $<\alpha_i, \beta_i, 0, 0>$, where $\alpha_i$ and $\beta_i$ are as updated at act 1120. The hop count may be set to 0 because, from the perspective of the city-wide environment 700, the demand information is originating from the demand controller i. The timestamp may also be set to 0 because the demand information is freshly obtained at act 1120.

Then, the process 1100 proceeds to act 1140 to check whether the demand tuple $D_i$ has changed or a certain amount of time (e.g., 10 seconds) has elapsed since the last broadcast to the network of meter controllers in the city-wide environment 700. If so, the process 1100 broadcasts at act 1150 the demand tuple $D_i$ together with the identifier i and then returns to the "Wait" state 1110. If, on the other hand, the determination at act 1140 is negative, then the process 1100 omits the broadcast and returns directly to the "Wait" state 1110. As discussed above in connection with FIG. 4, the broadcast frequency (e.g., 10 seconds) may be chosen to achieved a desired balance between the need to prevent flooding and the need to propagate fresh information. Also, in this embodiment, the check at act 1140 is implemented to reduce the number of broadcast messages to prevent flooding in the network, but other techniques may also be employed for this purpose.

Figure 12:
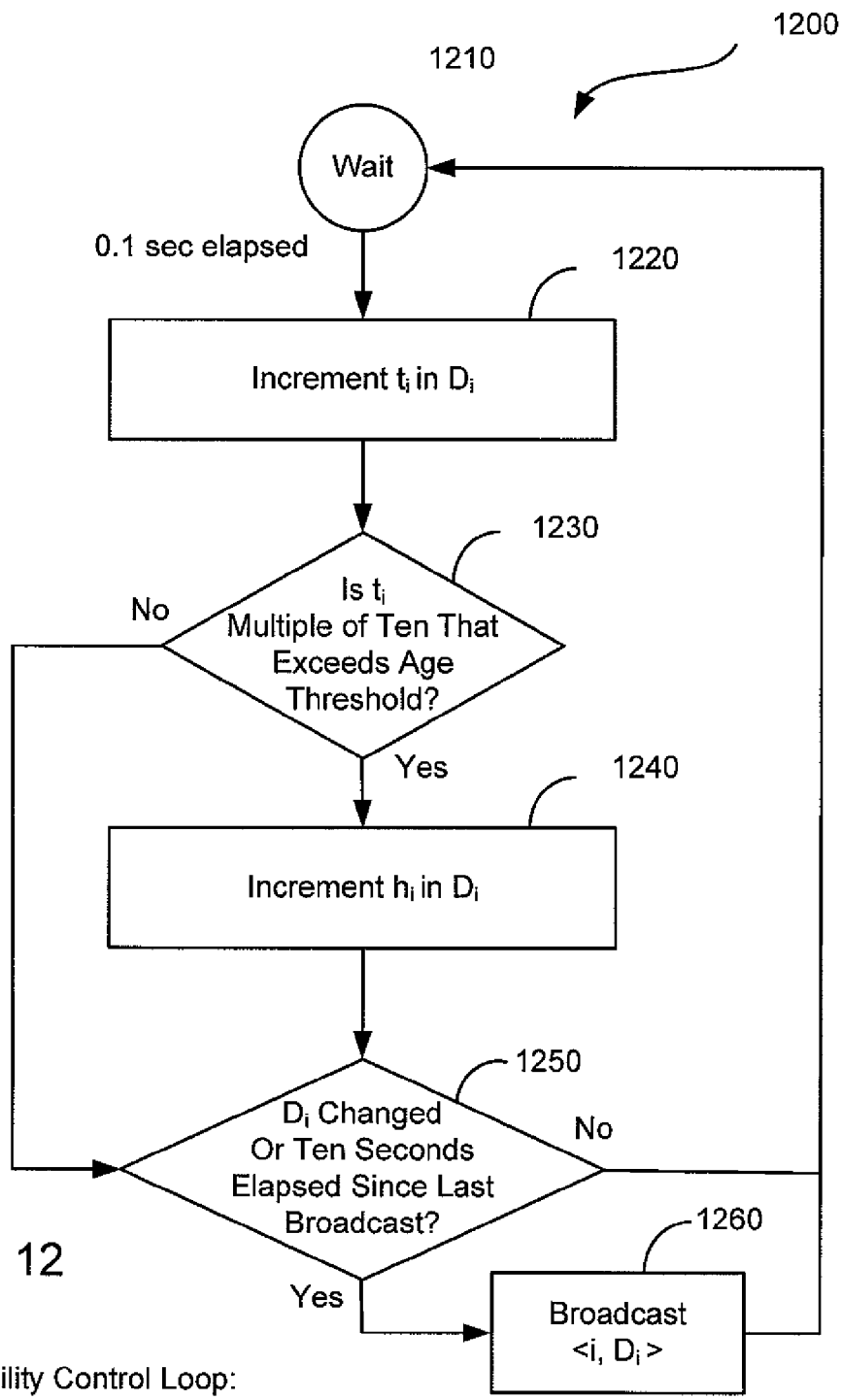
FIG. 12 illustrates a process that may be performed by a meter controller participating in a utility control loop in accordance with one embodiment of the invention.

FIG. 12 illustrates an example of a process 1200 that may be performed by a meter controller participating in the utility control loop. As before, the meter controller may be associated with an index i that may be of a same or different type as the identifiers used for appliance controllers.

As discussed above, the meter controller i may receive demand information via the utility control loop. In this embodiment, the demand information comprises two values, $\alpha_i$ and $\beta_i$, reflecting respectively a present power consumption level and a target power consumption level for the city-wide environment 700. These values may be stored by the meter controller i in a demand tuple of the form $D_i = <\alpha_i, \beta_i, h_i, t_i>$, where $\alpha_i$ and $\beta_i$ are 64-bit IEEE floating point numbers, $h_i$ is a 32-bit integer representing a hop count, and $t_i$ is an 8-bit integer representing a timestamp.

The process 1200 may comprise a plurality of acts performed by the meter controller i on a continual or periodic basis. As discussed above in connection with FIG. 4, the frequency at which the process 1200 is performed may be chosen to maximize the accuracy and freshness of available information without exceeding the computational capabilities of the meter controller i or the communication capabilities of the meter controller i and/or the network of the city-wide environment 700.

In the embodiment shown in FIG. 12, the process 1200 may enter a "Wait" state 1210 and stays there until some predetermined amount of time (e.g., 0.1 seconds) has elapsed since the latest entry into the "Wait" state 1210. Then, the process 1200 proceeds to act 1220 to increment the timestamp $t_i$ in the demand tuple $D_i$. Then, at act 1230, the process 1200 determines whether $t_i$ is a multiple of ten that exceeds an age threshold (e.g., 150). If the determination is positive, the process 1200 proceeds to act 1240 to increase the hop count $h_i$ by one and then to act 1250 to check whether the information in the demand tuple $D_i$ other than the timestamp $t_i$ has changed since the last broadcast to the network of the city-wide environment 700. If the determination is negative, the process 1200 skips act 1240 and proceeds to act 1250.

In this embodiment, the increase of the hop count $h_i$ at act 1240 may be artificial in the sense that it may not correspond to the demand information traversing an additional meter controller. Rather, it may be triggered after the demand information reaches a certain age (in this case, after $t_i$ reaches 150), to indicate that demand information may become increasingly unreliable as it ages. While this technique may help to improve the reliability of the demand information propagated via the utility control loop, it is not required by the invention.

Returning to FIG. 12, the process 1200 determines at act 1250 whether the demand tuple $D_i$ has changed or if a predetermined amount of time (e.g., 10 seconds) has elapsed since the last broadcast. If the determination is positive, the process 1200 broadcasts at act 1260 the demand tuple $D_i$ together with the identifier i and then returns to the "Wait" state 1210. If, on the other hand, the determination is negative, the process 1200 omits the broadcast and returns directly to the "Wait" state 1210. Similar to act 1140 of FIG. 11 performed by a demand controller, the check at act 1250 may be implemented to reduce the number of broadcast messages to prevent flooding in the network. Other suitable techniques for preventing flooding may also be employed.

Figure 13:
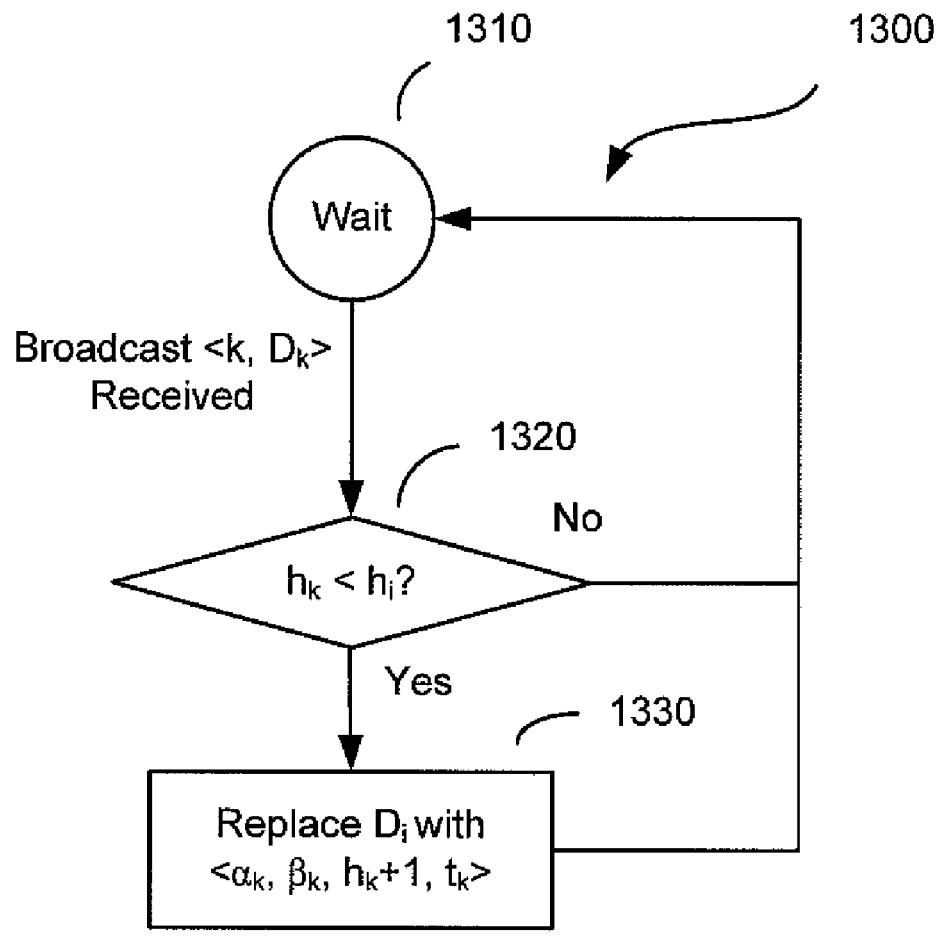
FIG. 13 illustrates a process that may be performed by a meter controller to process a broadcast message received from another meter controller in a utility control loop in accordance with one embodiment of the invention.

FIG. 13 illustrates an example of a process 1300 that may be performed by the meter controller i to process a broadcast message $<k, D_k>$ received from another meter controller k via the utility control loop, where $D_k$ is of the form $<\alpha_k, \beta_k, h_k, t_k>$. Upon receiving the message, the process 1300 may exit a "Wait" state 1310 and proceed to act 1320, where the process 1300 determines whether the received hop count $h_k$ is lower than the hop count $h_i$ in the demand tuple $D_i = <\alpha_i, \beta_i, h_i, t_i>$ maintained by the meter controller i. If yes, the received demand tuple is deemed more reliable than the local demand tuple, and the process 1300 proceeds to act 1330 to replace the local demand tuple $D_i$ with a new tuple $<\alpha_k, \beta_k, h_k+1, t_k>$, where the hop count is incremented by one to reflect the additional meter controller (namely, the meter controller i) traversed by the demand information. Then the process 1300 returns to the "Wait" state 1310 until the next broadcast message is received.

If, on the other hand, the received hop count $h_k$ is determined at act 1320 not to be lower than the local hop count $h_i$, the received demand tuple is deemed no more reliable than the local demand tuple, and the process 1300 returns directly to the "Wait" state 1310 without updating the local demand tuple $D_i$.

VII. Local Control Loop

The utility control loop exemplified in FIGS. 11-13 above may allow each meter controller in the city-wide environment 700 to receive sufficiently up-to-date demand information that indicates a city-wide demand modification (e.g., a degree of city-wide demand reduction) requested by the demand controller. Based on this information, and the representative view of the global state of power demand supplied by the city-wide modeling loop (e.g., the representative model $m_i$), each meter controller may be able to determine a control input indicative of a local demand modification (e.g., a degree of local demand reduction) to be imposed within its associated local environment. For example, each meter controller may determine the control input by applying a suitable operator to combine the demand information from the utility control loop and the representative view from the city-wide modeling loop. A given meter controller may also participate in a local control loop together with the appliance controllers in its associated local environment, so as to propagate the control input to the appliance controllers.

In one embodiment, the control input determined by the meter controller may comprise a control demand category that can be used by appliance controllers to determine whether the appliances under their control should be turned on or off. For example, any appliance in a demand category "superior" to the control demand category may remain on, while any appliance in a demand category "inferior" to the control demand category may be turned off. That is, any appliance whose level of flexibility (e.g., as specified by the consumer) is lower than that associated with the control demand category may remain on, and any appliance whose level of flexibility is higher than that associated with the control demand category may be turned off. However, it should be appreciated that other ways of implementing the control input may also be possible.

Figure 14:
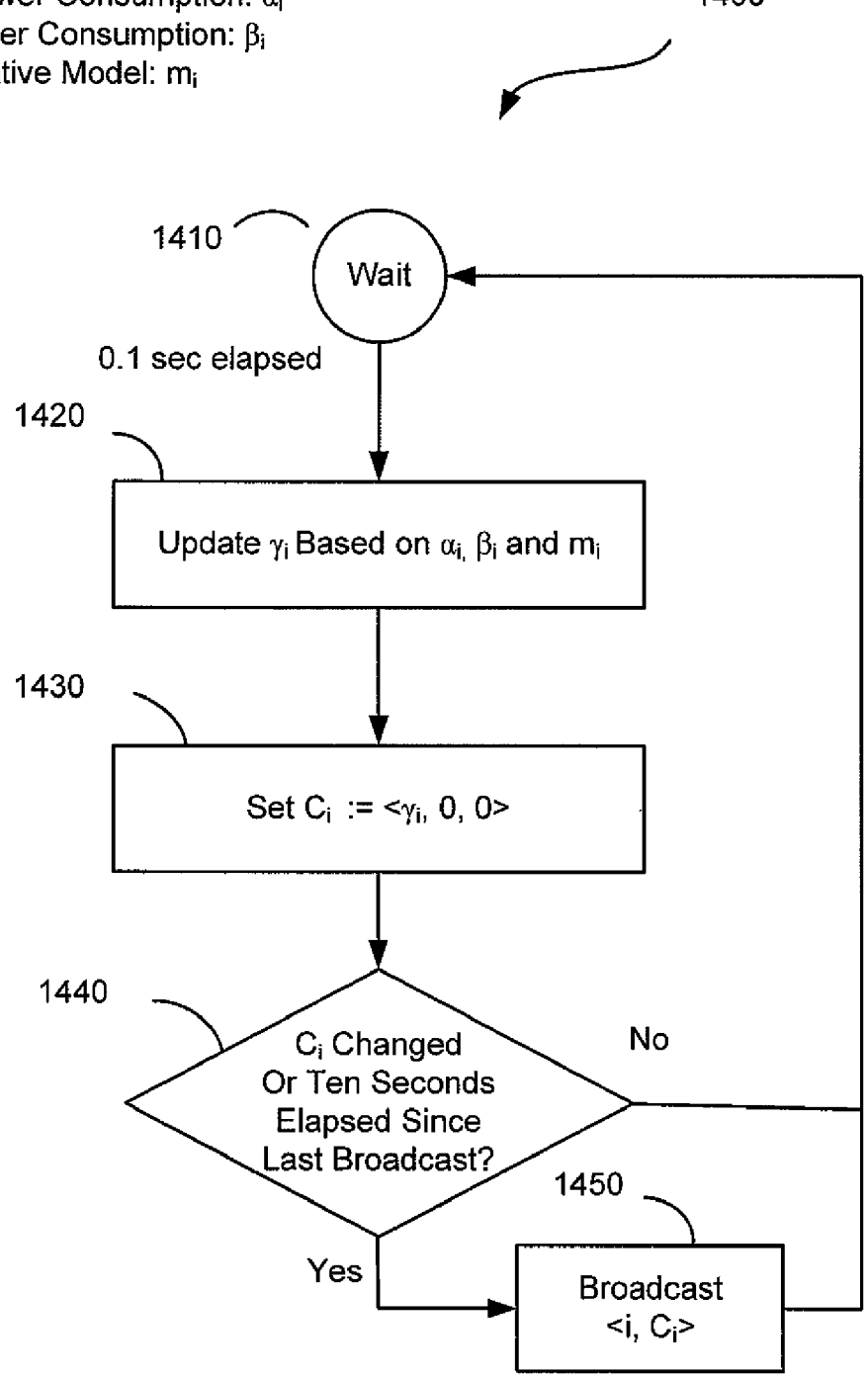
FIG. 14 illustrates a process that may be performed by a meter controller participating in a local control loop in accordance with one embodiment of the invention.

FIG. 14 illustrates an example of a process 1400 that may be performed by a meter controller participating in a local control loop. As before, the meter controller may be associated with an index i that may be of a same or different type as the identifiers used for appliance controllers.

For the local control loop, the meter controller may maintain in its state a control tuple $C_i = \langle \gamma_i, h_i, t_i \rangle$, where $\gamma_i$, $h_i$ and $t_i$ are 8-bit integers. The value $\gamma_i$ may be the control demand category, and the values $h_i$ and $t_i$ may be, respectively, a hop count and a timestamp associated with the value $\gamma_i$ to measure how reliable and/or fresh it is. To compute $\gamma_i$, the meter controller i may use the following information: the present power consumption level $\alpha_i$ and the target power consumption level $\beta_i$, as supplied by the utility control loop, and the representative model $m_i$, as supplied by the city-wide modeling loop.

The process 1400 may comprise a plurality of acts performed by the meter controller i on a continual or periodic basis. As discussed above in connection with FIG. 4, the frequency at which the process 1400 is performed may be chosen to maximize the accuracy and freshness of available information without exceeding the computational capabilities of the meter controller i or the communication capabilities of the meter controller i and/or the network of the city-wide environment 700.

In the embodiment shown in FIG. 14, the process 1400 may enter a "Wait" state 1410 and stay there until some predetermined amount of time (e.g., 0.1 seconds) has elapsed since the latest entry into the "Wait" state 1410. Then, the process 1200 proceeds to act 1420 to update the control demand category $\gamma_i$ based on the present power consumption level $\alpha_i$, the target power consumption level $\beta_i$ and the representative model $m_i$. Further details regarding the computation of $\gamma_i$ are described below in connection with FIG. 15.

Then, at act 1430, the meter controller sets the control tuple $C_i$ to be $\langle \gamma_i, 0, 0 \rangle$. The hop count $h_i$ is set to 0 because the value $\gamma_i$ is computed by the meter controller i itself, and the timestamp is also set to 0 because the value $\gamma_i$ has been freshly updated in act 1420.

Having thus updated the control tuple $C_i$, the process 1400 may check at act 1440 whether $C_i$ has changed or a certain amount of time (e.g., 10 seconds) has elapsed since the last broadcast to the local network 300. If so, the process 1400 broadcasts at act 1450 (e.g., to the local network 300) the control tuple $C_i$ together with the identifier i and then returns to the "Wait" state 1410. If, on the other hand, the determination at act 1440 is negative, then the process 800 omits the broadcast and returns directly to the "Wait" state 1410. As discussed above in connection with FIG. 4, the broadcast frequency (e.g., every 10 seconds) may be chosen to achieved a desired balance between the need to prevent flooding in the network and the need to propagate fresh information. However, it should be appreciated that the invention is not limited to the use of these techniques, or any techniques at all, for reducing broadcast traffic.

Figure 15:
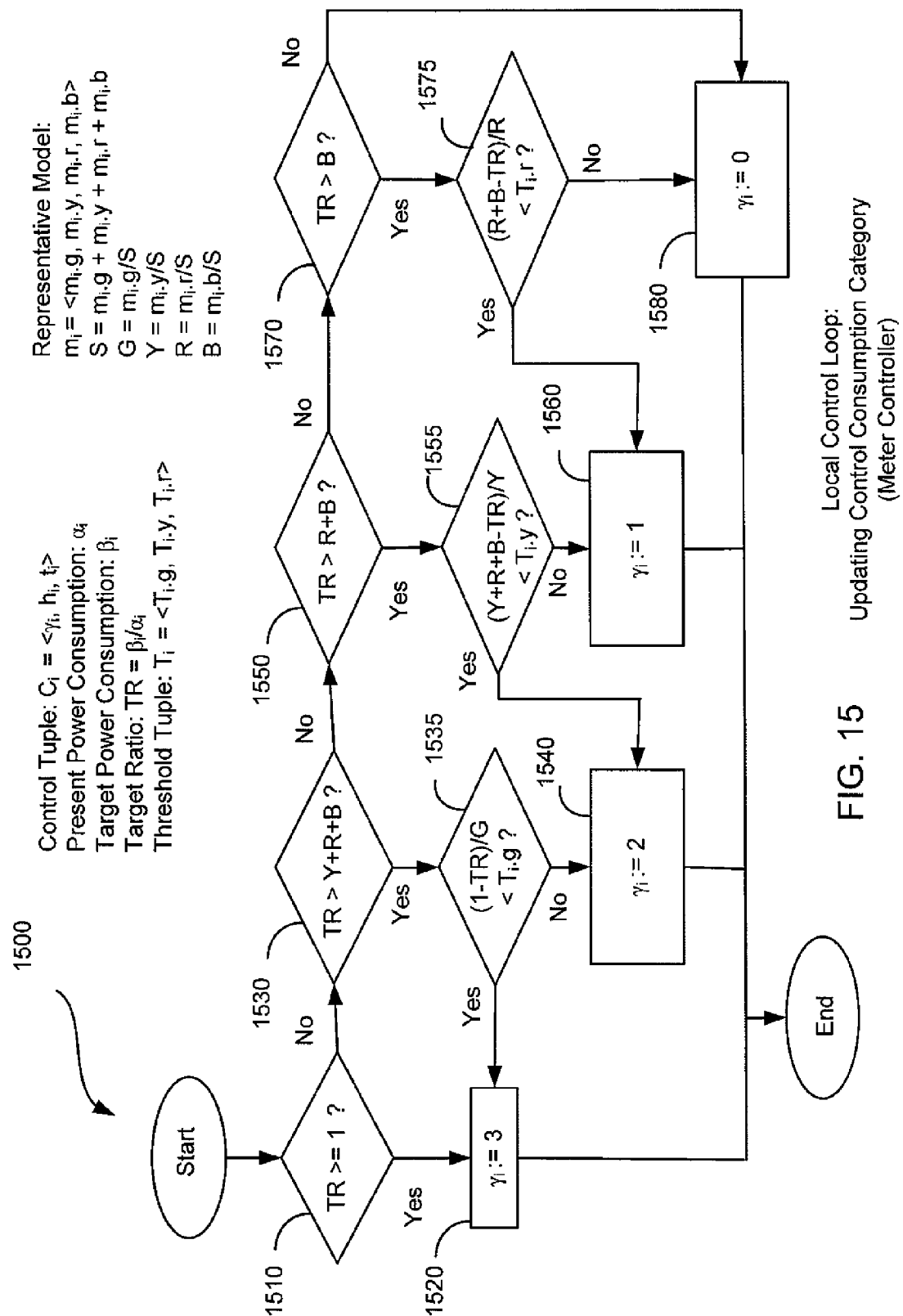
FIG. 15 shows a process that may be performed by a meter controller participating in a local control loop to update a control demand category in accordance with one embodiment of the invention.

FIG. 15 shows an illustrative process 1500 that may be employed at act 1420 of FIG. 14 to update the control demand category $\gamma_i$. In this embodiment, the meter controller i may maintain in its state for the local control loop a threshold tuple $T_i = \langle T_i \cdot g, T_i \cdot y, T_i \cdot r \rangle$, in addition to the control tuple $C_i$. Each of $T_i \cdot g$, $T_i \cdot y$ and $T_i \cdot r$ may be a number chosen randomly or pseudo-randomly from the unit interval [0,1]. An illustrative process for choosing these values is discussed in greater detail below in connection with FIG. 16.

In the embodiment shown in FIG. 15, several auxiliary values may also be computed by the meter controller i. For example, the meter controller i may compute a target ratio $TR = \beta_i / \alpha_i$ and a representative per-consumer total consumption $S = m_i \cdot g + m_i \cdot y + m_i \cdot r + m_i \cdot b$, using respectively information supplied by the utility control loop and the city-wide modeling loop. For each demand category, the meter controller i may compute, based on the representative model $m_i$ supplied by the city-wide modeling loop, the fraction of power consumption corresponding to that category:

Representative fraction of "green" consumption: $G = m_i \cdot g / S$.

Representative fraction of "yellow" consumption: $Y = m_i \cdot y / S$.

Representative fraction of "red" consumption: $R = m_i \cdot r / S$.

Representative fraction of "black" consumption: $B = m_i \cdot b / S$.

At act 1510, the process 1500 determines whether the target ratio is at least one. A positive determination may indicate that no reduction is being requested, and therefore the process 1500 proceeds to act 1520 to set $\gamma_i$ to a value (e.g., 3) corresponding to the most flexible demand category (e.g., "green"). As discussed further below, this may lead to no reduction in the local environment associated with the meter controller i.

If the determination is negative, the process 1500 proceeds to act 1530 to determine whether the target ratio is greater than the sum of Y, R and B. A positive determination may indicate that, to meet the target power consumption level, it is sufficient to turn off a portion of the appliances in the "green" category. In that case, the process proceeds to act 1535 to determine whether "green" appliances in the local environment associated with the meter controller i should be turned off. For reasons explained below, this may be done by checking whether the value $(1-TR)/G$ is below the threshold $T_i \cdot g$. If $(1-TR)/G$ is below $T_i \cdot g$, then $\gamma_i$ is set to 3 at act 1520, which may lead to no reduction in the local environment associated with the meter controller i; otherwise, $\gamma_i$ is set to 2 at act 1540, which may lead to all "green" appliances in the local environment being turned off.

Since in this case the target ratio is greater than the sum of Y, R and B, only a portion of the "green" consumption in the city may need to be reduced. The value $(1-TR)/G$ may correspond to the amount of requested reduction in "green" consumption relative to all "green" consumption. On the other hand, if every meter controller in the city-wide environment 700 chooses the threshold $T_i \cdot g$ randomly or pseudo-randomly, it can be expected that the percentage of meter controllers choosing a threshold $T_i \cdot g$ smaller than $(1-TR)/G$ would be the same as $(1-TR)/G$. Thus, comparing the value $(1-TR)/G$ with a randomly chosen threshold $T_i \cdot g$ at each controller may be an effective way of choosing, in a decentralized manner, a sufficiently large subset of meter controllers whose "green" consumption is to be reduced. Furthermore, as discussed below in connection with FIG. 16, the threshold $T_i \cdot g$ may be reset periodically (e.g., every five minutes), so that a meter controller who lost "green" consumption can be expected to regain it after a certain amount of time. This wait time may depend on the value $(1-TR)/G$, which reflects the degree to which reduction in "green" consumption is being requested. For example, if $(1-TR)/G$ is large, then the wait time can be expected to be longer. The frequency at which the threshold $T_i \cdot g$ is reset may be chosen to ensure that the demand reduction is fairly implemented. For example, if a reduction request in the "green" category is in effect for an extended period of time, each "green" appliance may be off only part of the time (e.g., when its threshold $T_i \cdot g$ happens to be smaller than $(1-TR)/G$).

When every meter controller participates in an "honest" way (e.g., by choosing the threshold $T_i \cdot g$ randomly or pseudo-randomly), reduction in "green" consumption may be imposed in an equitable manner. For instance, up to discrepancies resulting from propagation delays and/or network errors, all meter controllers may maintain the same information via the city-wide modeling loop and the utility control loop. They may also execute the same process for determining a control demand category. As a result, no meter controllers may be favored or disfavored.

The rest of process 1500 proceeds in a similar fashion.

If at act 1530 it is determined that the target ratio is no greater than the sum of Y, R and B, the process 1500 proceeds to act 1550 to determine whether the target ratio is greater than the sum of R and B. A positive determination may indicate that, to meet the target power consumption level, it is sufficient to turn off all appliances in the "green" category and a portion of the appliances in the "yellow" category. In that case, the process proceeds to act 1555 to determine whether "yellow" appliances in the local environment associated with the meter controller i should be turned off. For example, this may be done by checking whether the value $(Y+R+B-TR)/Y$ is below the threshold $T_i \cdot y$, because the value $(Y+R+B-TR)/Y$ may correspond to the amount of requested reduction in "yellow" consumption relative to all "yellow" consumption. If $(Y+R+B-TR)/Y$ is below $T_i \cdot y$, then $\gamma_i$ is set to 2 at act 1540, which may lead to no reduction in "yellow" consumption in the local environment associated with the meter controller i; otherwise, $\gamma_i$ is set to 1 at act 1560, which may lead to all "yellow" appliances in the local environment being turned off. In either case, all "green" appliances in the local environment are also turned off.

If at act 1550 it is determined that the target ratio is no greater than the sum of R and B, the process 1500 proceeds to act 1570 to determine whether the target ratio is greater than B. A positive determination may indicate that, to meet the target power consumption level, it is sufficient to turn off all appliances in the "green" category, all appliances in the "yellow" category, and a portion of the appliances in the "red" category. In that case, the process proceeds to act 1575 to determine whether "red" appliances in the local environment associated with the meter controller i should be turned off. For example, this may be done by checking whether the value $(R+B-TR)/R$ is below the threshold $T_i \cdot r$, because the value $(R+B-TR)/Y$ may correspond to the amount of requested reduction in "red" consumption relative to all "red" consumption. If $(R+B-TR)/R$ is below $T_i \cdot r$, then $\gamma_i$ is set to 1 at act 1560, which may lead to no reduction in "red" consumption in the local environment associated with the meter controller i; otherwise, $\gamma_i$ is set to 0 at act 1580, which may lead to all "red" appliances in the local environment being turned off. In either case, all "green" appliances and "yellow" appliances in the local environment are also turned off.

If at act 1570 it is determined that the target ratio is no greater than B, the process 1500 proceeds to act 1580 to set $\gamma_i$ to 0. In this case, all but "black" appliances may be turned off. The process 1500 then ends in all branches after a value is chosen for $\gamma_i$.

Figure 16:
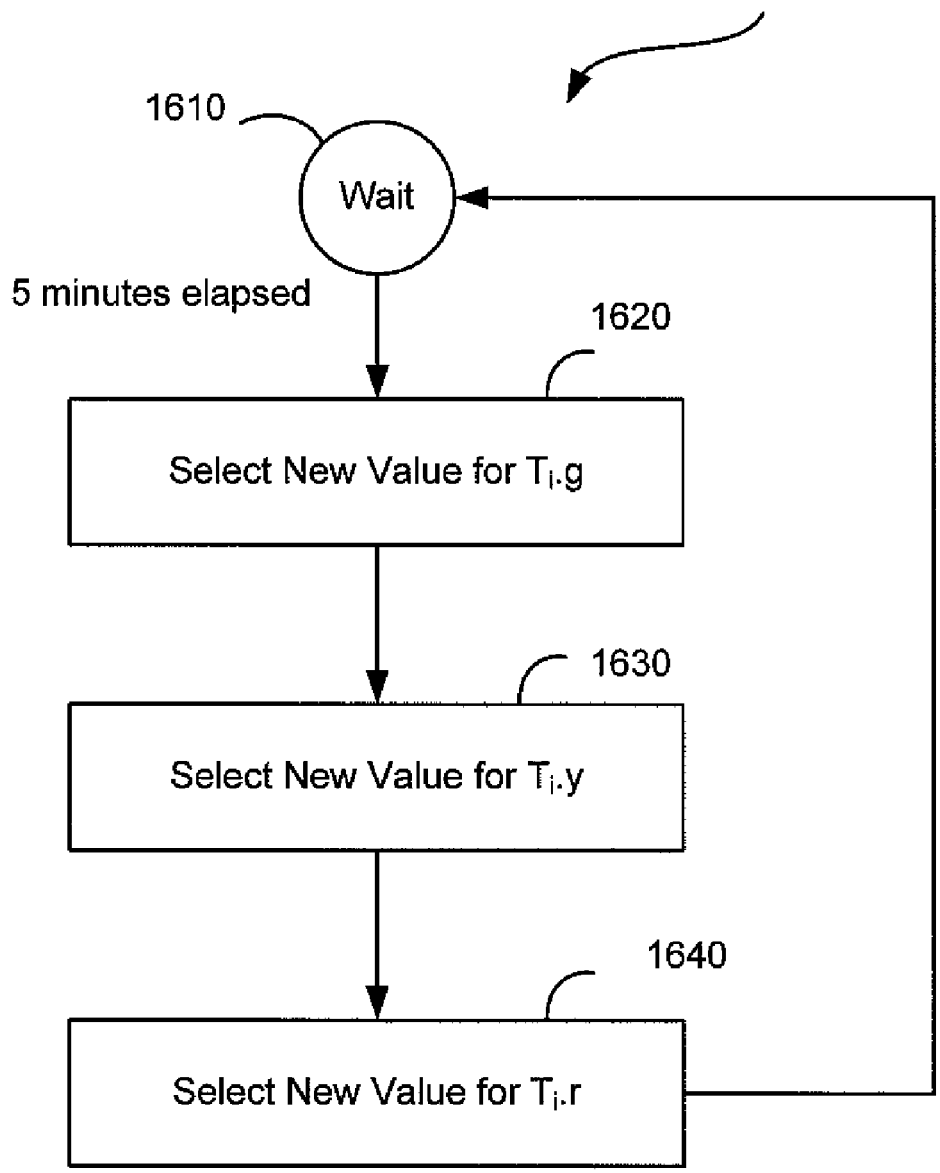
FIG. 16 shows a process that may be performed by a meter controller participating in a local control loop to reset a threshold tuple $T_i$ used to determined a control demand category, in accordance with one embodiment of the invention.

FIG. 16 shows an illustrative process 1600 that may be employed in connection with process 1500 to reset the threshold tuple $T_i = <T_i \cdot g, T_i \cdot y, T_i \cdot r>$ periodically. For example, the process 1600 may reset $T_i$ every five minutes by exiting a "Wait" state 1610 after five minutes has elapsed since its last entry. Then, the process proceeds to acts 1620, 1630 and 1640 to select a new value for each of $T_i \cdot g$, $T_i \cdot y$ and $T_i \cdot r$, respectively. As discussed above, each of these values may be selected randomly or pseudo-randomly from the unit interval [0,1]. For example, the Mersenne-Twister algorithm may be used for each pseudo-random selection.

Figure 17:
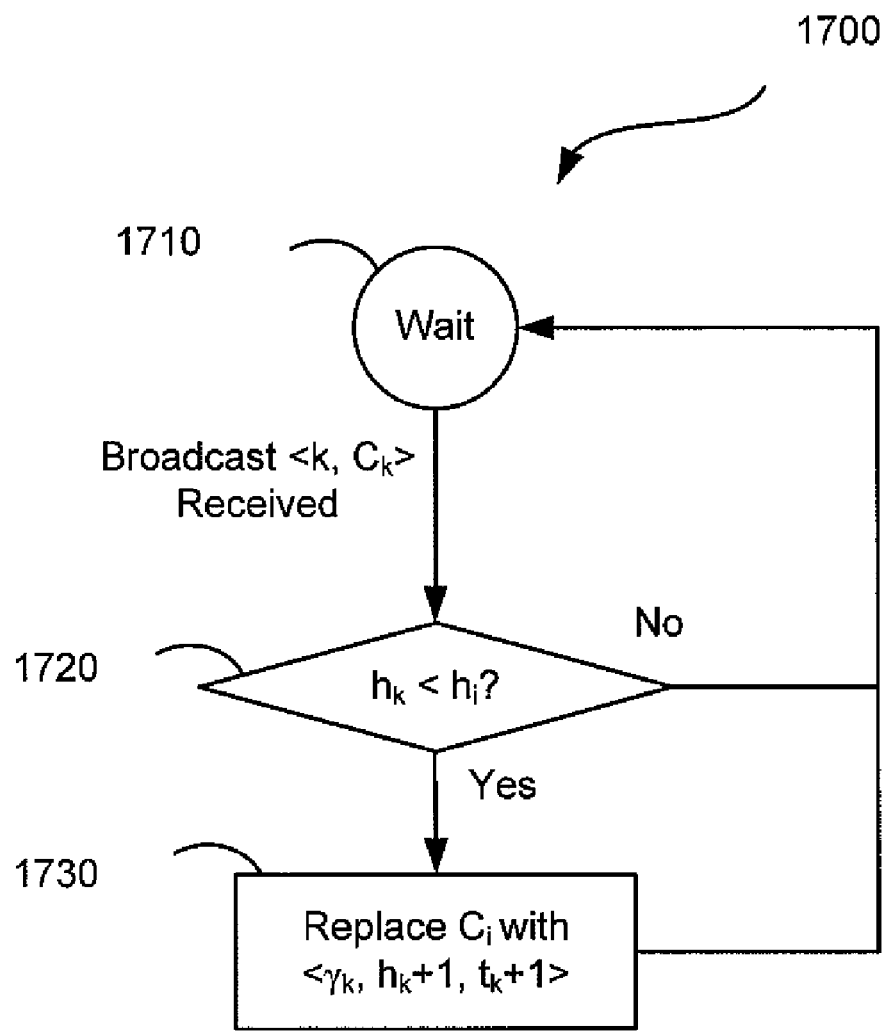
FIG. 17 illustrates a process that may be performed by an appliance controller to process a broadcast message received via a local control loop in accordance with one embodiment of the invention.

FIG. 17 illustrates an example of a process 1700 that may be performed by an appliance controller i to process a broadcast message $<k, C_k>$ received via the local control loop. Upon receiving the message, the process 1700 may exit a "Wait" state 1710 and proceed to act 1720 to compare the hop counts $h_k$ and $h_i$. When it is determined that $h_k$ is less than $h_i$, the received control tuple is deemed more reliable, and the process 1700 proceeds to act 1730 to replace $C_i$ with a new tuple $<\gamma_k, h_k+1, t_k+1>$. The new hop count may be incremented by one because one more appliance controller (i.e., appliance controller i) has been traversed. The new timestamp may also incremented by a suitable amount (e.g., one), because some amount of time has elapsed since the control tuple $C_k$ is transmitted. Then the process 1700 returns to the "Wait" state 1710 until the next broadcast message is received.

When it is determined at act 1720 that $h_k$ is no less than $h_i$, the received control tuple is deemed no more reliable, and the process 1700 returns directly to the "Wait" state 1710 without updating $C_i$.

Figure 18:
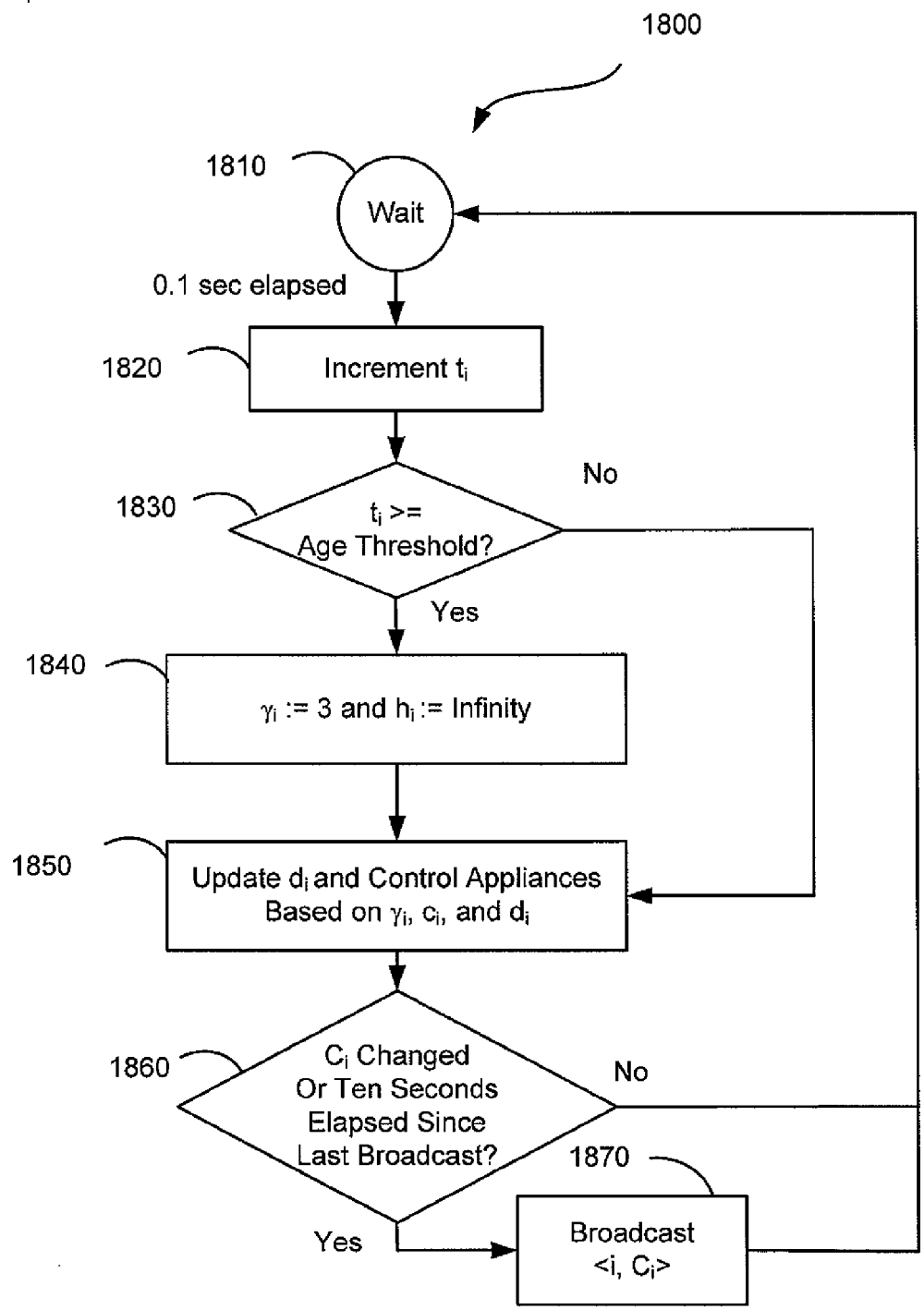
FIG. 18 shows a process that may be performed by an appliance controller to control a power demand of one or more appliances based on a control input received via a local control loop, in accordance with one embodiment of the invention.

FIG. 18 shows an example of a process 1800 that may be performed by the appliance controller i to modify the power demand of the appliances under its control in accordance with the control input received via the local control loop. The appliance controller i may also continually broadcast its up-do-date control input to the local environment 300, as a way of further propagating the control input. Since all appliance controllers participating in the local control loop may perform the same type of periodic updates and broadcasts, each appliance controller may be provided with a sufficiently up-to-date version of the control input.

In this embodiment, the appliance controller i may maintain in its state for the local control loop a control tuple $C_i = <\gamma_i, h_i, t_i>$, where $\gamma_i$, $h_i$ and $t_i$ are 8-bit integers. The control tuple $C_i$ may be provided via the process 1700 of FIG. 17, based on broadcast messages received in the local control loop. The appliance controller i may additionally maintain a delay timer $d_i$, which may be a 32-bit integer. The use of $d_i$ is discussed in greater detail below in connection with FIG. 19. Furthermore, the appliance controller i may use the demand category $c_i$ provided by the local modeling loop.

The process 1800 may comprise a plurality of acts performed by the appliance controller i on a continual or periodic basis. As discussed above in connection with FIG. 4, the frequency at which the process 1800 is performed may be chosen to maximize the accuracy and freshness of available information without exceeding the computational capabilities of the appliance controller i or the communication capabilities of the appliance controller i and/or the network of appliance controllers in the local environment 300.

In the embodiment shown in FIG. 18, the process 1800 may enter a "Wait" state 1810 and stays there until some predetermined amount of time (e.g., 0.1 seconds) has elapsed since the latest entry into the "Wait" state 1810. Then, the process 1800 proceeds to act 1820 to increment the timestamp $t_i$. Then, at act 1830, the process 1800 determines whether $t_i$ exceeds an age threshold (e.g., 150). If the determination is positive, the process 1800 proceeds to act 1840 to set the hop count $h_i$ to a high value (e.g., a value corresponding to infinity) and the control demand category $\gamma_i$ to 3, and then the process 1800 proceeds to act 1850 to control the power consumption of its controlled appliances.

If, on the other hand, the determination at act 1830 is negative, the process proceeds directly to act 1850 without modifying the hop count and the control demand category.

In this embodiment, the hop count is set to a high value after the control input (in this case, the control demand category $\gamma_i$) reaches a certain age (e.g., after $t_i$ reaches 150). This may indicate that the control input has become unreliable due to its age. As a result, the control demand category $\gamma_i$ may be modified to 3, which may indicate that no reduction in power consumption should be implemented until a fresh control input is received. While this technique may help to improve the reliability of the control input propagated via the local control loop, it is not required by the invention.

At act 1850, the process 1800 updates the delay timer $d_i$ and determines whether its controlled appliances should be turned on or off at this point in time. Further details of this act is discussed below in connection with FIG. 19.

Figure 19:
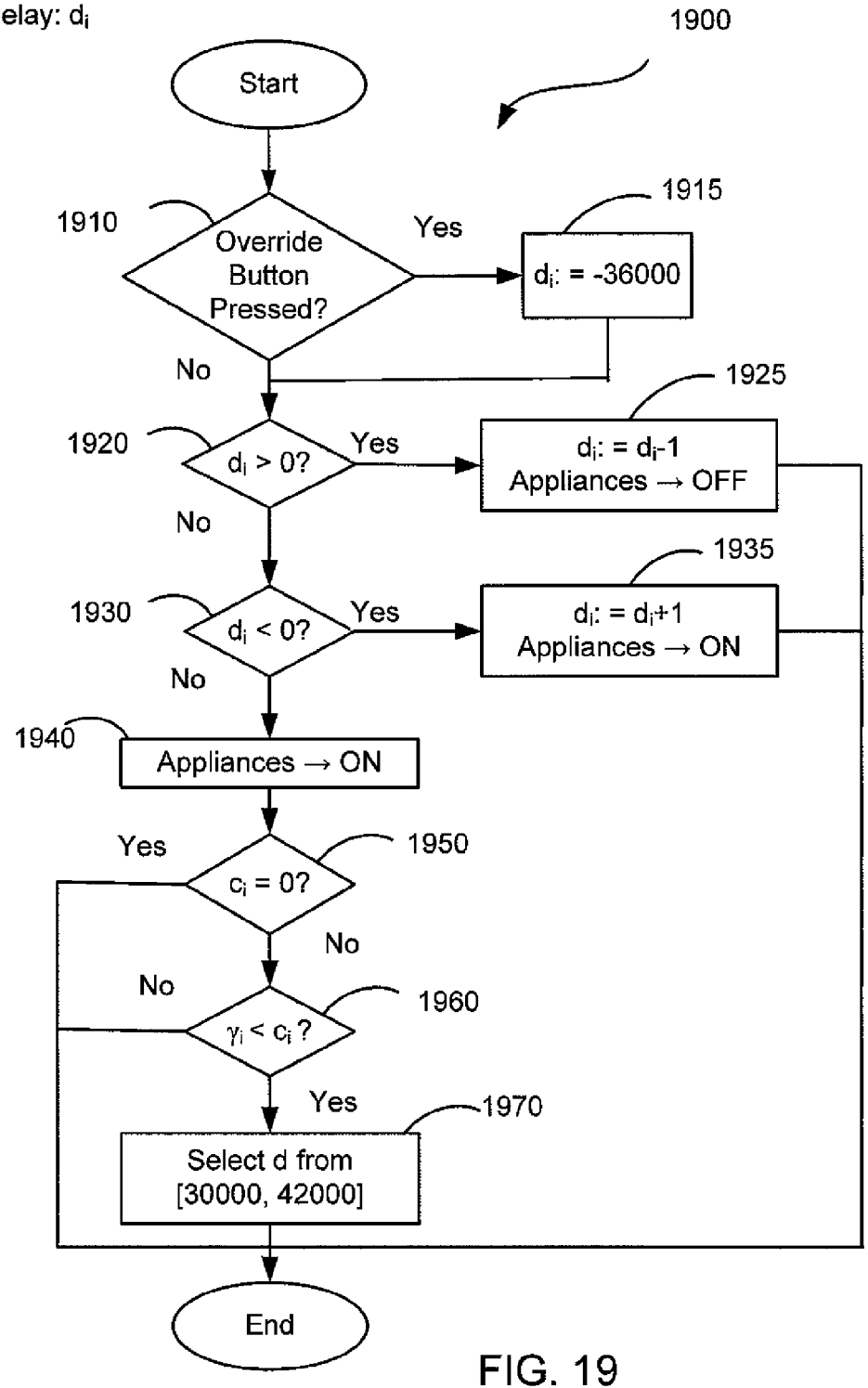
FIG. 19 illustrates a process that may be performed by an appliance controller to determine whether one or more appliances under its control are to be turned on or off, in accordance with one embodiment of the invention.

Then, the process 1800 proceeds to act 1860 to check whether the information in the control tuple $C_i$ other than the timestamp $t_i$ has changed or a predetermined amount of time (e.g., every 10 seconds) has elapsed since the last broadcast to the local network. If the determination is positive, the process 1800 broadcasts at act 1870 the control tuple $C_i$ together with the identifier i and then returns to the "Wait" state 1810. If, on the other hand, the determination at act 1860 is negative, the process 1800 omits the broadcast and returns directly to the "Wait" state 1810. As discussed above in connection with FIG. 4, the check at act 1860 may be implemented to reduce the number of broadcast messages to prevent flooding in the network, and other suitable techniques for preventing flooding may also be employed FIG. 19 illustrates an example of a process 1900 that may be performed by the appliance controller i to determine whether the controlled appliances under its control should be turned on or off, based on the control input provided by the local control loop and the demand category $c_i$ provided by the local modeling loop. In this embodiment, $c_i$ is specified by the consumer via the local modeling loop.

In this embodiment, the appliance controller comprises an override button that allows the consumer to override a specified demand category. In act 1910, the process 1900 determines whether the override button has been pressed. If yes, the process 1900 proceeds to act 1915 to set the delay timer $d_i$ to a large negative value, such as −36000. This may indicate that the controlled appliances should remain on for at least one hour, unless the consumer deactivates the override button in the interim. If the override button has not been pressed, the delay timer $d_i$ is not modified at this point.

The process 1900 then proceeds to act 1920 to determine whether the delay timer $d_i$ has a positive value. In this embodiment, a positive value for $d_i$ may indicate that the controlled appliances should be turned off. While the appliances are turned off, $d_i$ may be decremented so that, absent interrupting events such as the consumer pressing the override button, $d_i$ returns to zero after some amount of time. At that point, the controlled appliances may regain power. Thus, the magnitude of $d_i$ may correspond to the length of the remaining time period during which the controlled appliances do not receive power. Similarly, a negative value for $d_i$ may indicate that the controlled appliances should be turned on and, in that case, the magnitude of $d_i$ may correspond to the length of the remaining time period during which the controlled appliances continue to receive power.

An illustrative implementation of such a modification policy is discussed below. However, it should be appreciated that the invention is not limited to the modification policies or their implementations described herein. Other policies and/or implementations, such as desynchronizing duty cycles of different appliances, may also be suitable.

Returning to FIG. 19, when it is determined at act 1920 that the delay timer $d_i$ has a positive value, the process 1900 proceeds to act 1925, where $d_i$ is decremented by one and the appliances are controlled to be off. When it is determined at act 1920 that the delay timer $d_i$ does not have a positive value, the process 1900 proceeds to act 1930 to determine whether the delay timer $d_i$ has a negative value. If yes, the process 1900 proceeds to act 1935, where $d_i$ is incremented by one and the appliances are controlled to be on. After either act 1925 or act 1935, the process 1900 ends.

If the determinations at acts 1920 and 1930 are both negative, the delay timer $d_i$ may be zero, in which case the process 1900 proceeds to act 1940 to control the appliances to be on and then to update the delay timer $d_i$ in acts 1950, 1960 and 1970. At act 1950, it is determined whether the demand category $c_i$ specified by the consumer for the controlled appliances is zero (i.e., "black"). If yes, the controlled appliances are determined to be critical and the delay timer $d_i$ is not modified. Otherwise, it is determined at act 1960 whether the control demand category $\gamma_i$ supplied by the local control loop is below the demand category $c_i$ specified by the consumer for the controlled appliances.

A positive determination at act 1960 may indicate that reduction in the demand category $c_i$ is being requested, and therefore the process 1900 proceeds to act 1970 to select a positive value for the delay timer $d_i$. The value may be selected according to the desired amount of time for which the controlled appliances should be off. For example, the value may be selected from the interval [30000, 42000], so that the controlled appliances may be turned off for 50 to 70 minutes. However, it should be appreciated that any suitable value for $d_i$ may be selected, as the invention is not limited in this respect.

Furthermore, the value for $d_i$ may be selected randomly or pseudo-randomly, e.g., by applying the Mersenne-Twister algorithm. This may prevent appliances in the same demand category from regaining power all at the same time. Such a spike in power demand may be undesirable because it may lead to system failures.

While various inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The above-described embodiments of the invention can be implemented in any of numerous ways. For example, the embodiments may be implemented using hardware, software or a combination thereof. When implemented in software, the software code can be executed on any suitable processor or collection of processors, whether provided in a single computer or distributed among multiple computers.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine.

In this respect, the invention may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement the various embodiments of the invention discussed above. The computer readable medium or media can be transportable, such that the program or programs stored thereon can be loaded onto one or more different computers or other processors to implement various aspects of the present invention as discussed above.

The terms "program" or "software" are used herein in a generic sense to refer to any type of computer code or set of computer-executable instructions that can be employed to program a computer or other processor to implement various aspects of the present invention as discussed above. Additionally, it should be appreciated that according to one aspect of this embodiment, one or more computer programs that when executed perform methods of the present invention need not reside on a single computer or processor, but may be distributed in a modular fashion amongst a number of different computers or processors to implement various aspects of the present invention.

Computer-executable instructions may be in many forms, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that conveys relationship between the fields. However, any suitable mechanism may be used to establish a relationship between information in fields of a data structure, including through the use of pointers, tags or other mechanisms that establish relationship between data elements.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B", when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. An appliance controller apparatus for controlling a first power demand of at least one first appliance, the appliance controller apparatus comprising:
a user interface configured to receive, from a consumer that requires power, a user input indicative of a first demand flexibility associated with the at least one first appliance;
a communication interface configured to receive a control input indicative of a request to modify the first power demand of the at least one first appliance; and
at least one processor programmed to determine whether the first power demand of the at least one first appliance is to be modified based at least in part on the user input and the control input;
wherein the appliance controller apparatus is a first appliance controller apparatus, and wherein:
the communication interface is further configured to receive at least one message from a second appliance controller apparatus, the at least one message comprising second information regarding a second power demand of at least one second appliance coupled to the second appliance controller apparatus and a second demand flexibility associated with the at least one second appliance; and
the first appliance controller apparatus further comprises a storage medium, and wherein the at least one processor is further programmed to store in the storage medium summary information based at least in part on:
first information regarding the first power demand and the first demand flexibility; and
the second information regarding the second power demand and the second demand flexibility.

2. The appliance controller apparatus of claim 1, wherein the at least one processor is further programmed to modify the first power demand of the at least one first appliance based at least in part on the user input and the control input.

3. The appliance controller apparatus of claim 1, wherein the control input comprises information indicative of a degree to which a reduction in the first power demand of the at least one first appliance is requested, and wherein the at least one processor is programmed to determine whether the first power demand of the at least one first appliance is to be reduced based at least in part on the user input and the control input.

4. The appliance controller apparatus of claim 1, wherein the user interface comprises a multi-setting switch for specifying the first demand flexibility.

5. The appliance controller apparatus of claim 1, wherein the user interface comprises a dial for specifying the first demand flexibility.

6. The appliance controller apparatus of claim 1 wherein the at least one message from the second appliance controller apparatus is a first message, and wherein the communication interface is further configured to transmit a second message comprising the summary information.

7. The appliance controller apparatus of claim 3, wherein the user input and the control input are both numerical values, and wherein the at least one processor determines that the first power demand of the at least one first appliance is to be reduced when the user input exceeds the control input.

8. The appliance controller apparatus of claim 1, further comprising an override interface configured to receive an override input, wherein, when the override input is received, the at least one processor determines that the first power demand of the at least one first appliance is not to be modified, regardless of the user input and the control input.

9. The appliance controller apparatus of claim 1, wherein:
the first demand flexibility associated with the at least one first appliance includes a plurality of levels of the first demand flexibility; and
the user interface specifies respective levels of the plurality of levels of the first demand flexibility.

10. The appliance controller apparatus of claim 9, wherein:
the user interface includes a multi-setting switch to specify the respective levels; and
the respective levels are associated with different colors indicated via the multi-setting switch.

11. The appliance controller apparatus of claim 10, wherein the different colors are selected to be suggestive of demand flexibility categories represented by the respective levels so as to make the user interface intuitive for a consumer using the appliance controller apparatus.

12. The appliance controller apparatus of claim 11, wherein:
the different colors include black, yellow, red and green;
a critical demand flexibility category represented by the respective levels is associated with black;
an important demand flexibility category represented by the respective levels is associated with red;
a flexible demand flexibility category represented by the respective levels is associated with yellow; and
an optional demand flexibility category represented by the respective levels is associated with green.

13. The appliance controller apparatus of claim 1, wherein:
the first demand flexibility associated with the at least one first appliance includes varying levels of the first demand flexibility; and
the user interface specifies the varying levels of the first demand flexibility on a continuous scale.

14. A method for controlling a first power demand of at least one first appliance, the method comprising:
A) receiving, via a user interface of a first appliance controller, from a consumer that requires power, a user input indicative of a first demand flexibility associated with the at least one first appliance;
B) receiving, via a communication interface of the first appliance controller, a control input indicative of a request to modify the first power demand of the at least one first appliance; and
C) determining whether the first power demand of the at least one first appliance is to be modified based at least in part on the user input and the control input;
wherein the appliance controller is a first appliance controller, and wherein the method further comprises:
D) receiving, via the communication interface, at least one message from a second appliance controller, the at least one message comprising second information regarding a second power demand of at least one second appliance coupled to the second appliance controller and a second demand flexibility associated with the at least one second appliance;
wherein the first appliance controller further comprises a storage medium, and wherein the method further comprises:
E) storing, in the storage medium, summary information based at least in part on:
first information regarding the first power demand and the first demand flexibility; and the second information regarding the second power demand and the second demand flexibility.

15. The method of claim 14, further comprising modifying the first power demand of the at least one first appliance based at least in part on the user input and the control input.

16. The method of claim 14, wherein:
in B), the control input comprises information indicative of a degree to which a reduction in the first power demand of the at least one first appliance is requested; and
C) comprises determining whether the first power demand of the at least one first appliance is to be reduced based at least in part on the user input and the control input.

17. The method of claim 16, wherein the user input and the control input are both numerical values, and wherein C) comprises:
determining that the first power demand of the at least one first appliance is to be reduced when the user input exceeds the control input.

18. The method of claim 14, wherein:
the first demand flexibility associated with the at least one first appliance includes a plurality of levels of the first demand flexibility; and
A) comprises receiving the user input indicative of respective levels of the plurality of levels of the first demand flexibility.

19. The method of claim 18, wherein:
the user interface includes a multi-setting switch to specify the respective levels;
the respective levels are associated with different colors indicated via the multi-setting switch, and
the different colors are selected to be suggestive of demand flexibility categories represented by the respective levels.

20. The method of claim 14, wherein:
the first demand flexibility associated with the at least one first appliance includes varying levels of the first demand flexibility; and
A) comprises receiving the user input indicative of the varying levels of the first demand flexibility on a continuous scale.

21. The method of claim 14, wherein:
in D), the at least one message from the second appliance controller is a first message; and
the method further comprises:
F) transmitting, via the communication interface, a second message comprising the summary information.

22. The method of claim 14, further comprising:
D) receiving an override input; and
E) in response to D), determining that the first power demand of the at least one first appliance is not to be modified, regardless of the user input and the control input.

23. At least one non-transitory computer-readable medium encoded with a plurality of instructions that, when executed, perform a method for controlling a first power demand of at least one first appliance, the method comprising acts of:
receiving, via a user interface of a first appliance controller, from a consumer that requires power, a user input indicative of a first demand flexibility associated with the at least one first appliance;
receiving, via a communication interface of the first appliance controller, a control input indicative of a request to modify the first power demand of the at least one first appliance; and
determining whether the first power demand of the at least one first appliance is to be modified based at least in part on the user input and the control input;
wherein the appliance controller is a first appliance controller, and wherein the method further comprises:
receiving, via the communication interface, at least one message from a second appliance controller, the at least one message comprising second information regarding a second power demand of at least one second appliance coupled to the second appliance controller and a second demand flexibility associated with the at least one second appliance;
wherein the first appliance controller further comprises a storage medium, and wherein the method further comprises:
storing, in the storage medium, summary information based at least in part on:
first information regarding the first power demand and the first demand flexibility; and
the second information regarding the second power demand and the second demand flexibility.

* * * * *